US012568873B2

(12) United States Patent
Morimoto et al.

(10) Patent No.: US 12,568,873 B2
(45) Date of Patent: Mar. 10, 2026

(54) AGRICULTURAL ASSISTANCE SYSTEM

(71) Applicant: KUBOTA CORPORATION, Osaka (JP)

(72) Inventors: Takanori Morimoto, Sakai (JP); Tomohiro Kinoshita, Sakai (JP); Shinnosuke Ishikawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 81 days.

(21) Appl. No.: 18/442,148

(22) Filed: Feb. 15, 2024

(65) Prior Publication Data

US 2024/0180062 A1 Jun. 6, 2024

Related U.S. Application Data

(63) Continuation of application No. PCT/JP2022/029964, filed on Aug. 4, 2022.

(30) Foreign Application Priority Data

Aug. 20, 2021 (JP) ................................. 2021-135054

(51) Int. Cl.
*A01B 79/00* (2006.01)
*A01B 69/04* (2006.01)
(Continued)

(52) U.S. Cl.
CPC .......... *A01B 79/005* (2013.01); *A01B 69/008* (2013.01); *B64U 10/60* (2023.01); *B64U 70/93* (2023.01); *B64U 2101/40* (2023.01)

(58) Field of Classification Search
CPC .... A01B 79/005; A01B 69/008; B64U 10/60; B64U 70/93; B64U 2101/40; B64U 10/16;
(Continued)

(56) References Cited

U.S. PATENT DOCUMENTS

2016/0318607 A1* 11/2016 Desai ...................... A01M 7/00
2017/0127606 A1* 5/2017 Horton ................. A01B 69/001
(Continued)

FOREIGN PATENT DOCUMENTS

DE 102014201203 A1 7/2015
GB 2533140 A * 6/2016 ............. B64U 80/86
(Continued)

OTHER PUBLICATIONS

Machine Translation of JP2018151745A (Year: 2018).*
(Continued)

*Primary Examiner* — Anne Marie Antonucci
*Assistant Examiner* — Jordan T Smith
(74) *Attorney, Agent, or Firm* — Keating & Bennett, LLP

(57) ABSTRACT

An agricultural assistance system includes a sensor in or on an unmanned aerial vehicle to perform sensing of a shape of an agricultural field when the unmanned aerial vehicle flies over the agricultural field, and a line creator configured or programmed to create a planned travel line for automatic operation of an agricultural machine. The line creator is configured or programmed to acquire the shape of the agricultural field obtained by the sensing before the automatic operation of the agricultural machine, and create the planned travel line on a virtual field representing the acquired shape of the agricultural field.

4 Claims, 24 Drawing Sheets

(51) Int. Cl.
    *B64U 10/60*     (2023.01)
    *B64U 70/93*     (2023.01)
    *B64U 101/40*     (2023.01)

(58) Field of Classification Search
    CPC .............. B64U 80/86; B64U 2101/30; B64U
        2201/10; G05D 2109/10; G05D 2105/15;
        G05D 2107/21; G05D 2109/254; G05D
        2111/10; G05D 1/6484; G05D 1/249;
        G05D 1/678; G05D 1/692; B64F 3/02
    See application file for complete search history.

(56) References Cited

U.S. PATENT DOCUMENTS

| | | | | |
|---|---|---|---|---|
| 2018/0100740 | A1* | 4/2018 | Seo ...................... | A01B 69/008 |
| 2018/0174290 | A1* | 6/2018 | Yoshida ................ | G06T 7/0002 |
| 2019/0208695 | A1* | 7/2019 | Graf Plessen ....... | A01B 69/008 |
| 2020/0117201 | A1* | 4/2020 | Oetken ................ | G05D 1/0231 |
| 2021/0027634 | A1* | 1/2021 | Li ............................. | G08G 5/32 |
| 2021/0129982 | A1* | 5/2021 | Collins .................. | B64U 10/60 |
| 2022/0019242 | A1* | 1/2022 | Wu ....................... | G05D 1/0016 |

| | | | | |
|---|---|---|---|---|
| 2022/0136849 | A1* | 5/2022 | Pell ........................ | G06V 20/56 |
| | | | | 701/410 |
| 2023/0172090 | A1* | 6/2023 | Yamaguchi .......... | G05D 1/0212 |
| | | | | 701/23 |
| 2024/0016074 | A1* | 1/2024 | Nishii .................. | G05D 1/2247 |

FOREIGN PATENT DOCUMENTS

| | | | | |
|---|---|---|---|---|
| JP | 2017-13653 | A | | 1/2017 |
| JP | 2018-108034 | A | | 7/2018 |
| JP | 2018151845 | A | * | 9/2018 |
| JP | 2019-135963 | A | | 8/2019 |
| JP | 2020-106975 | A | | 7/2020 |

OTHER PUBLICATIONS

Official Communication issued in corresponding European Patent Application No. 22858330.8, mailed on Jul. 28, 2025, 8 pages.
Official Communication issued in corresponding Australian Patent Application No. 2022330478, mailed on Sep. 30, 2025, 4 pages.
Sulistijono et al., "Aerial Drone Mapping and Trajectories Generator for Agricultural Ground Robots", International Symposium on Community-Centric Systems (CCS), IEEE, Sep. 23, 2020, 6 pages.

* cited by examiner

G7(MP2)

"Before automatic travel"

"After automatic travel"

H1(D2)

L1

L1b

L1a

AGRICULTURAL ASSISTANCE SYSTEM

CROSS REFERENCE TO RELATED APPLICATIONS

This application is a continuation application of International Application No. PCT/JP2022/029964, filed on Aug. 4, 2022, which claims the benefit of priority to Japanese Patent Application No. 2021-135054, filed on Aug. 20, 2021. The entire contents of each of these applications are hereby incorporated herein by reference.

BACKGROUND OF THE INVENTION

1. Field of the Invention

The present invention relates to agricultural assistance systems.

2. Description of the Related Art

Japanese Unexamined Patent Application Publication No. 2020-106975 is known as a technique of automatic travel of a tractor. In Japanese Unexamined Patent Application Publication No. 2020-106975, a tractor travels in an agricultural field in a circumferential direction before starting automatic travel, the shape (outline) of the agricultural field is determined from the positions passed through by the tractor when traveling in the circumferential direction, so that the path for automatic travel is determined based on the determined shape of the agricultural field.

SUMMARY OF THE INVENTION

In Japanese Unexamined Patent Application Publication No. 2020-106975, it is necessary to measure the shape of the agricultural field from the positions passed through by the tractor by causing the tractor to travel in a circumferential direction before starting automatic travel, and, because the positions passed through by the tractor are not always the same, it is necessary to measure the shape of the agricultural field more accurately and then determine the path (line) for automatic travel.

Example embodiments of the present invention provide agricultural assistance systems each making it possible to acquire the shape of an agricultural field more accurately and easily create a planned travel line for automatic travel, by performing sensing of the shape of the agricultural field using an unmanned aerial vehicle before the automatic travel.

An agricultural assistance system according to an aspect of an example embodiment of the present invention includes a sensor in or on an unmanned aerial vehicle to perform sensing of a shape of an agricultural field when the unmanned aerial vehicle flies over the agricultural field, and a line creator configured or programmed to create a planned travel line for automatic operation of an agricultural machine, wherein the line creator is configured or programmed to acquire the shape of the agricultural field obtained by the sensing before the automatic operation of the agricultural machine, and create the planned travel line on a virtual field representing the acquired shape of the agricultural field.

The unmanned aerial vehicle may be operable to fly over the agricultural field in which the agricultural machine is performing the automatic operation. The line creator may be configured or programmed to acquire the shape of the agricultural field obtained by the sensing during the automatic operation of the agricultural machine, and correct the virtual field based on the acquired shape of the agricultural field.

The line creator may be configured or programmed to correct the planned travel line such that the corrected planned travel line corresponds to the virtual field corrected based on the shape of the agricultural field.

The agricultural assistance system may further include a calculator to calculate a three-dimensional shape of the agricultural field based on information obtained by the sensor performing the sensing of the agricultural field. The line creator may be configured or programmed to acquire the three-dimensional shape of the agricultural field calculated by the calculator, and create the planned travel line based on the acquired three-dimensional shape of the agricultural field.

The agricultural machine may include a cable to supply electric power to the unmanned aerial vehicle flying over the agricultural field.

The agricultural machine may include a takeoff/landing station for the unmanned aerial vehicle to take off and land, and the unmanned aerial vehicle may be operable to take off from the takeoff/landing station before the automatic operation of the agricultural machine, and perform the sensing of the shape of the agricultural field using the sensor.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
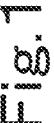
FIG. 1 is an overall plan view of a tractor.

The example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of the present invention will be described below with reference to the drawings.

Figure 2:
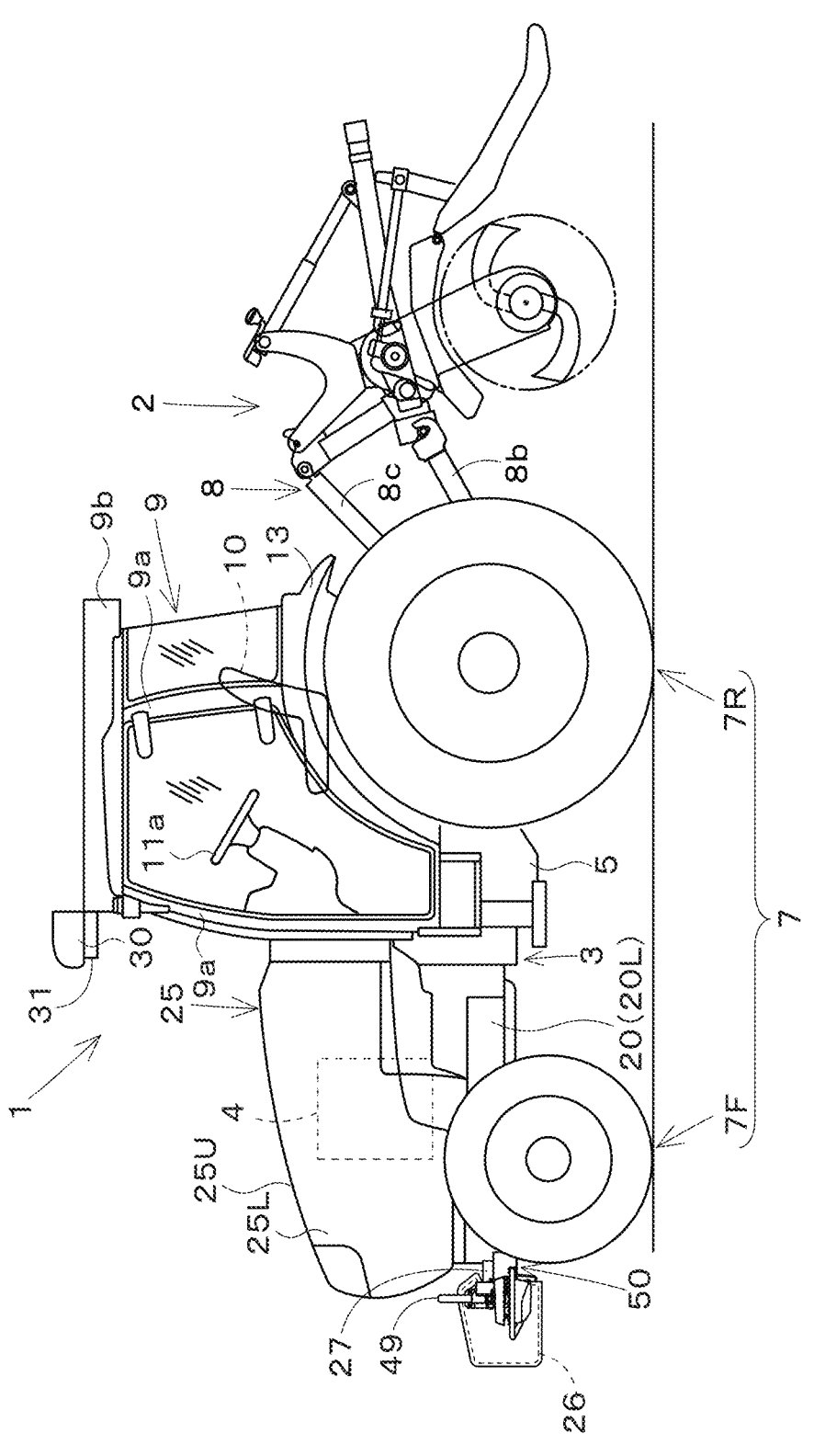
FIG. 2 is an overall side view of a tractor.

FIGS. 1 and 2 illustrate the entirety of an agricultural machine. The agricultural machine may be a tractor, a combine, a rice transplanter, or the like. The agricultural machine will be described using a tractor 1 as an example.

First Example Embodiment

As illustrated in FIGS. 1 and 2, the tractor 1 includes a vehicle body (travel vehicle body) 3, a prime mover 4, and a transmission 5. A travel device 7 is provided on the vehicle body 3. The travel device 7 supports the vehicle body 3 such that the vehicle body 3 is allowed to travel, and includes front wheels 7F and rear wheels 7R. The front wheels 7F and the rear wheels 7R, which are tires in the present example embodiment, may be crawlers. The prime mover 4 is an engine (diesel engine, gasoline engine), an electric motor, and/or the like. The transmission 5 can switch the propelling force of the travel device 7 via speed change, and can switch between forward travel and backward travel of the travel device 7. An operator's seat 10 is provided on the vehicle body 3. The operator's seat 10 is protected by a protector 9. The protector 9 is a cabin to protect the operator's seat 10, a ROPS to protect the operator's seat 10 by covering the operator's seat 10 at least from above, or the like.

As illustrated in FIGS. 1 and 2, the protector 9 includes a plurality of pillars 9a fixed to the vehicle body 3 and a roof 9b supported by the plurality of pillars 9a and located above the operator's seat 10. In a case that the protector 9 is a cabin, glass, door(s), and/or the like are provided between the plurality of pillars 9a, and the operator's seat 10 is covered by the glass, the door(s), and/or the like. Fenders 13 are attached to a lower portion of the protector 9, and the fenders 13 cover upper portions of the rear wheels 7R.

As illustrated in FIG. 1, the vehicle body 3 includes a vehicle body frame 20. The vehicle body frame 20 includes a vehicle body frame 20L provided on the left side and a vehicle body frame 20R provided on the right side. The vehicle body frame 20L and the vehicle body frame 20R each extend forward from the transmission 5 and support a lower portion of the prime mover 4. The vehicle body frame 20L and the vehicle body frame 20R are spaced from each other in the vehicle-body width direction. A front end portion of the vehicle body frame 20L and a front end portion of the vehicle body frame 20R are coupled by a front coupling plate 20F. A middle portion of the vehicle body frame 20L and a middle portion of the vehicle body frame 20R are coupled by a middle coupling plate 20M. The vehicle body frame 20L and the vehicle body frame 20R support a front axle case 29. A front axle to rotatably support the front wheels 7F is located in the front axle case 29. That is, in the present example embodiment, the vehicle body frame 20 is a front axle frame to support the front axle. Note that the vehicle body frame 20 may be a frame to support a structure other than the front axle case 29 (a frame other than the front axle frame).

As illustrated in FIGS. 1 and 2, a hood 25 is provided above the vehicle body frame 20. The hood 25 extends in the front-back direction along the vehicle body frame 20. The hood 25 is located forward of a widthwise middle portion of the protector 9. The hood 25 includes a left side wall 25L provided on the left side, a right side wall 25R provided on the right side, and an upper wall 25U that couples upper portions of the left side wall 25L and the right side wall 25R. An engine room is defined by the left side wall 25L, the right side wall 25R, and the upper wall 25U, and the prime mover 4, a cooling fan, a radiator, a battery, and/or the like are located in the engine room. The front wheels 7F are located leftward of the left side wall 25L and rightward of the right side wall 25R, respectively.

A weight 26 is provided in front of the hood 25, that is, in front of the vehicle body frames 20L and 20R. The weight 26 is attached to a weight bracket (weight mount) 27 provided on a front portion of the vehicle body 3. The weight bracket 27 is attached to the front coupling plate 20F of the vehicle body frame 20L using fastener(s) such as bolt(s).

A linkage 8 is provided on a back portion of the vehicle body 3. The linkage 8 removably connects a working device (such as an implement) 2 to the vehicle body 3. The linkage 8 is a swinging drawbar to connect the working device 2 and the vehicle body 3 and not perform raising or lowering, a lifting device including a three-point linkage and/or the like to perform raising and lowering, or the like. The working device 2 is a cultivator to perform cultivation, a fertilizer spreader to spread fertilizer, an agricultural chemical spreader to spread agricultural chemicals, a harvester to perform harvesting, a lister to perform listing, a mower to mow grass etc., a tedder to ted grass etc., a rake to rake grass etc., a baler to bale grass etc., or the like.

Figure 3:
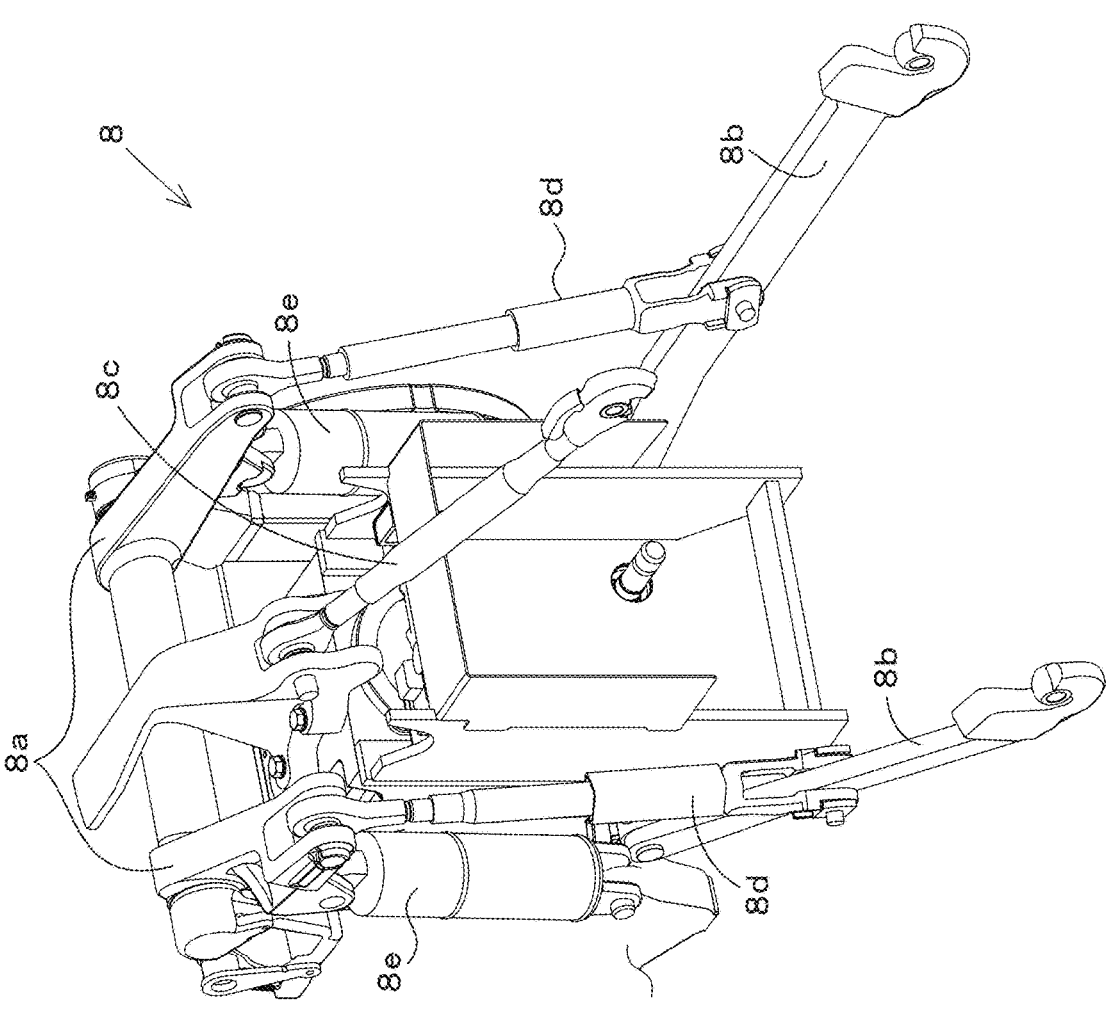
FIG. 3 is a perspective view of a lifting device.

FIG. 3 illustrates the linkage 8 which is a lifting device. As illustrated in FIG. 3, the linkage (lifting device) 8 includes lift arm(s) 8a, lower link(s) 8b, top link(s) 8c, lift rod(s) 8d, and/or lift cylinder(s) 8e. Front end portions of the lift arms 8a are supported by upper rear portions of a case (transmission case), which includes the transmission 5, such that the lift arms 8a are swingable upward or downward. The lift arms 8a swing (are raised or lowered) by being driven by the lift cylinders 8e. The lift cylinders 8e are hydraulic cylinders. The lift cylinders 8e are connected to a hydraulic pump via a control valve 34 illustrated in FIG. 4 described later. The control valve 34 may be a solenoid valve or the like to cause the lift cylinders 8e to extend and retract.

Front end portions of the lower links 8b are supported by lower rear portions of the transmission 5 such that the lower links 8b swingable upward and downward. A front end portion of the top link 8c is supported at a position higher than the lower links 8b by a rear portion of the transmission 5 such that the lop link 8*c* is swingable upward and downward. The lift rods 8*d* couple the lift arms 8*a* and the lower links 8*b*. The working device 2 is connected to rear portions of the lower links 8*b* and a rear portion of the top link 8*c*. When the lift cylinders 8*e* are driven (extend or retract), the lift arms 8*a* are raised or lowered, and the lower links 8*b*, which are coupled to the lift arms 8*a* via the lift rods 8*d*, are raised or lowered. Thus, the working device 2 swings upward or downward (is raised or lowered) about front portions of the lower link 8*b*.

As illustrated in FIGS. 1 and 2, the tractor 1 includes a position detector 30. The position detector 30 is attached forward of the roof 9*b* of the protector 9 via a mount 31. However, the position at which the position detector 30 is attached is not limited to the position illustrated FIGS. 1 and 2. The position detector 30 may be attached on the roof 9*b* of the protector 9 or on another portion of the vehicle body 3. The position detector 30 may be attached to the working device 2 which is a cultivator or the like as described earlier.

The position detector 30 detects the position thereof (measured position information including latitude and longitude) using a satellite positioning system. Specifically, the position detector 30 receives signals (positions of positioning satellites, transmission time, correction information, and/or the like) transmitted from the positioning satellite(s), and detects the position (latitude, longitude) based on the received signals. The position detector 30 may detect, as the position (latitude, longitude) thereof, a corrected position corrected based on a signal for correction, etc., from a base station (reference station) that can receive signals from the positioning satellites. The position detector 30 may include an inertial measurement unit such as a gyroscope sensor and/or an acceleration sensor, and may detect, as the position thereof, a position corrected by the inertial measurement unit. It is possible to detect the position of the vehicle body 3 of the tractor 1 (the position of the vehicle body 3 of the traveling tractor 1, may be referred to as "travel position") using the position detector 30.

As illustrated in FIG. 1, the tractor 1 includes a plurality of obstacle detectors 45. Each of the plurality of obstacle detectors 45 can detect objects in the vicinity of the tractor 1, i.e., obstacles. At least one of the plurality of obstacle detectors 45 is provided forward of the protector 9 and outward of the hood 25. That is, at least one obstacle detector 45 is located in an area forward of the protector 9 of the tractor 1 such that the at least one obstacle detector 45 is located leftward of the left side wall 25L of the hood 25 or rightward of the right side wall 25R of the hood 25. In the present example embodiment, the plurality of obstacle detectors 45 include an obstacle detector 45L provided on the left side of the vehicle body 3 (on the left side of the hood 25) and an obstacle detector 45R provided on the right side of the vehicle body 3 (the right side of the hood 25).

Each obstacle detector 45 may include a laser scanner 45A, sonar 45B, and/or the like. The laser scanner 45A detects an object (obstacle) by emitting laser light as detection waves. The laser scanner 45A detects the distance to the obstacle based on the time from emission to receipt of laser light. The sonar 45B detects an object (obstacle) by emitting sound waves as detection waves. The plurality of obstacle detectors 45 of the example embodiment described above need not be located outward of the hood 25, and the locations, etc., of the plurality of obstacle detectors 45 are not limited.

Figure 4:
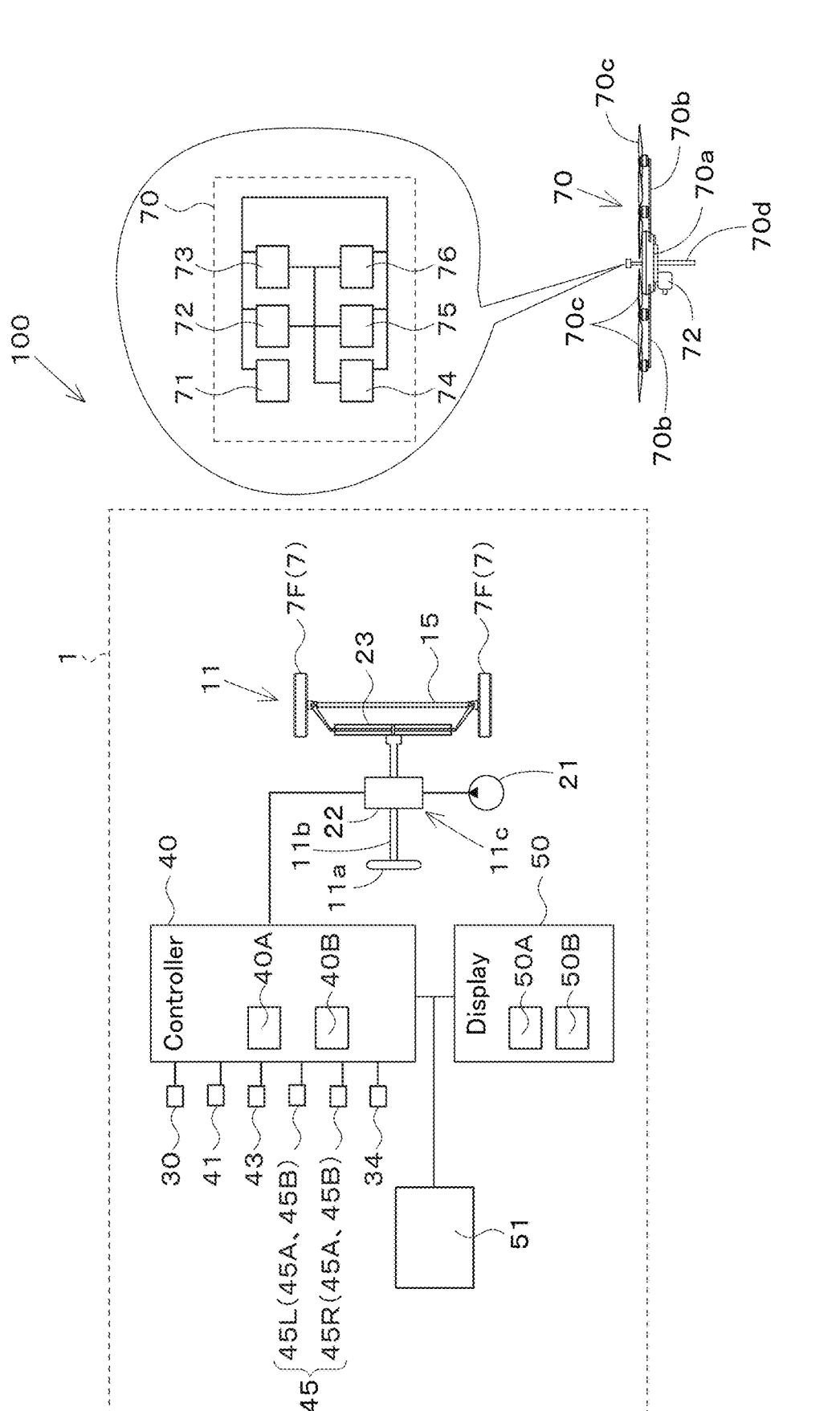
FIG. 4 is a control block diagram.

As illustrated in FIG. 4, the tractor 1 includes a steering device 11. The steering device 11 includes a steering wheel 11*a*, a rotary shaft (steering shaft) 11*b* which rotates as the steering wheel 11*a* rotates, and an assist mechanism (power steering mechanism) 11*c* to assist in steering of the steering wheel 11*a*. The assist mechanism 11*c* includes a hydraulic pump 21, a control valve 22 to be supplied with hydraulic fluid delivered by the hydraulic pump 21, and a steering cylinder 23 to be actuated by the control valve 22. The control valve 22 is a solenoid valve to be actuated based on a control signal. The control valve 22 is, for example, a three-way switching valve switchable by movement of a spool or the like. The control valve 22 is switchable also by steering of the steering shaft 11*b*. The steering cylinder 23 is connected to arms (knuckle arms) to change the orientation of the front wheels 7F.

Accordingly, when the steering wheel 11*a* is operated, the switching position and the opening of the control valve 22 are changed in accordance with the steering wheel 11*a*, the steering cylinder 23 extends or retracts leftward or rightward according to the switching position and the opening of the control valve 22, so that the steering direction of the front wheels 7F can be changed. The steering device 11 described above is an example, and the configuration of the steering device 11 is not limited to the configuration described above.

As illustrated in FIG. 4, the tractor 1 includes a controller 40, a display 50, and a communicator 51. The controller 40 may include CPU(s), electric circuit(s), electronic circuit(s), and/or the like, and may be configured or programmed to perform various controls concerning the tractor 1. The display 50 may include a liquid crystal panel, an organic EL panel, or the like, and displays various information of. The communicator 51 is configured or programmed to perform external communication. The communicator 51 is a communicator (communication module) to communicate with external equipment directly or indirectly. The communicator 51 can perform wireless communication via, for example, wireless fidelity (Wi-Fi, registered trademark) which is an IEEE802.11 standard, Bluetooth (registered trademark) Low Energy (BLE), Low Power, Wide Area (LPWA), Low-Power Wide-Area Network (LPWAN), or the like which are communication standards. The communicator 51 may be a communicator (communication module) to perform wireless communication via a mobile telephone communication network, a data communication network, or the like.

The controller 40 is connected with a state detector 41 to detect the driving state and/or the like of the tractor 1.

The state detector 41 is, for example, a device to detect the state of a travel system, and detects, for example, the state of a crank sensor, a cam sensor, an engine rotation sensor, an accelerator sensor, a vehicle speed sensor, a steering angle sensor, the position detector 30, and/or the like. The state detector 41 also includes device(s) to detect the state other than the state of the travel system, such as a lifting operation detecting sensor to detect the amount (degree), direction, and/or the like of operation of the lifting operation member (manual operator); a PTO rotation detection sensor; and the like.

As illustrated in FIG. 4, the controller 40 controls the travel system and a work system of the tractor 1. The controller 40 includes a travel controller 40A and a lifting controller 40B. The travel controller 40A and the lifting controller 40B include electric/electronic circuit(s) provided in the controller 40, program(s) stored in the controller 40, and/or the like.

Figure 5:
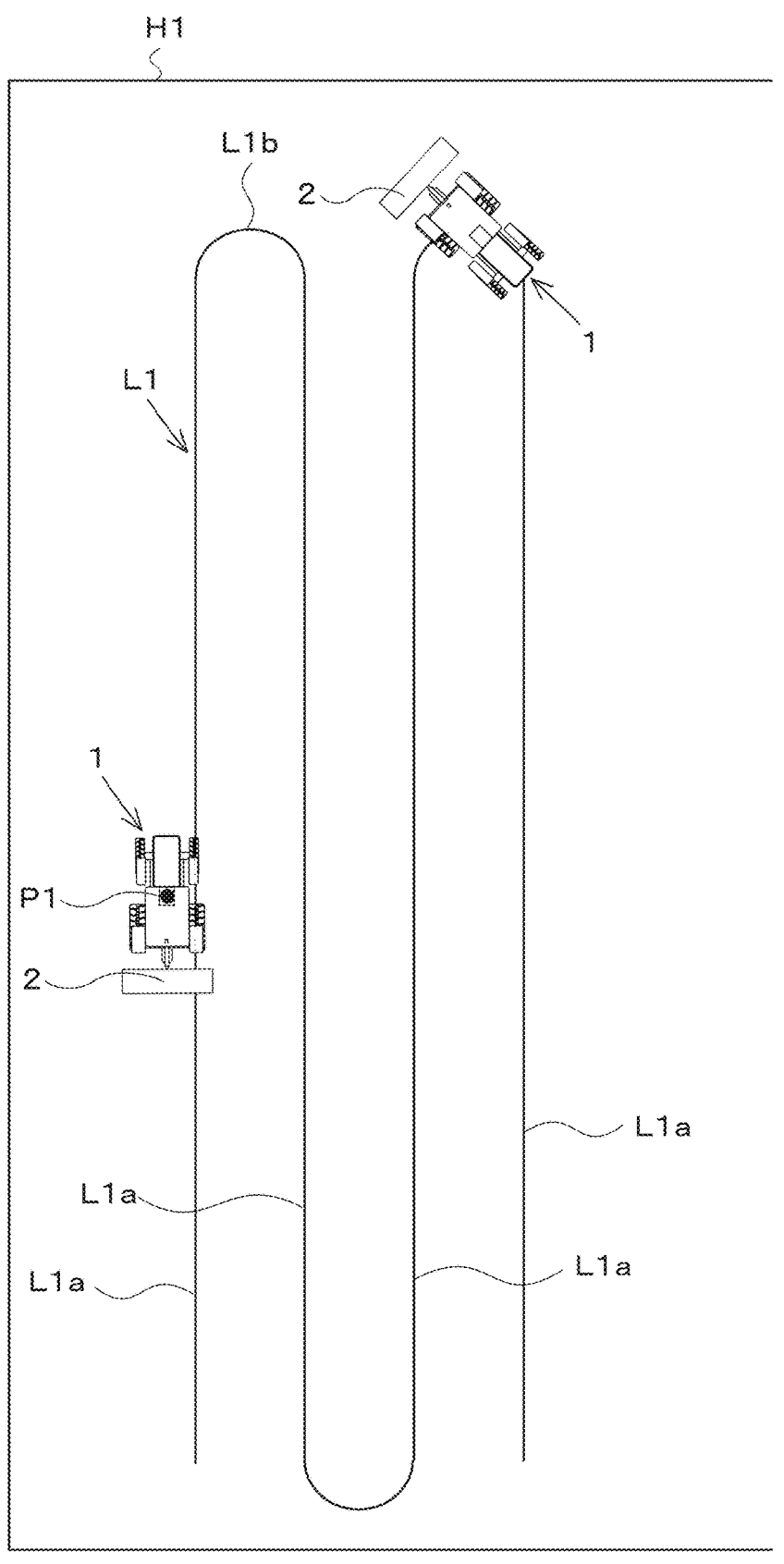
FIG. 5 illustrates automatic travel.

As illustrated in FIG. 5, the travel controller 40A performs automatic travel control. In automatic travel control, the travel controller 40A sets the switching position and the opening of the control valve 22 so that at least the travel position (position detected by the position detector 30) P1 of the vehicle body 3 matches a predetermined planned travel line (travel path) L1. In other words, the controller 40 sets the direction and amount (degree) of movement of the steering cylinder 23 (the steering direction and the steering angle of the front wheels 7F) so that the travel position P1 of the tractor 1 matches the planned travel line L1.

Specifically, the travel controller 40A compares the travel position P1 of the vehicle body 3 and the planned travel line L1. If the travel position P1 and the planned travel position match, the travel controller 40A does not change and holds the angle and the direction of rotation of the steering wheel 11a of the steering device 11 (the steering angle and the steering direction of the front wheels 7F) (does not change and maintains the opening and the switching position of the control valve 22). If the travel position P1 and the planned travel line L1 do not match, the travel controller 40A changes the angle and/or the direction of rotation of the steering wheel 11a of the steering device 11 (changes the opening and/or the switching position of the control valve 22) so that the deviation (displacement) of the travel position P1 from the planned travel line L1 is zero.

In the example embodiment described above, in automatic travel control, the travel controller 40A changes the angle of rotation of the steering device 11 based on the deviation of the travel position from the planned travel line L1. If the orientation of the planned travel line and the orientation (vehicle-body orientation) of the movement direction (travel direction) of the tractor 1 (the vehicle body 3) differ from each other, the travel controller 40A may set the steering angle so that the vehicle-body orientation matches the orientation of the planned travel line. The travel controller 40A may, in automatic travel control, set the final steering angle for the automatic travel control based on a steering angle determined based on the deviation (positional deviation) and a steering angle determined based on orientational deviation. The steering angle may be set using a method different from the aforementioned method of setting the steering angle for automatic travel control.

The travel controller 40A may, in automatic travel control, control the rotation speed of the travel device 7, that is, the front wheels 7F and/or the rear wheels 7R so that the actual vehicle speed of the tractor 1 (the vehicle body 3) matches a vehicle speed corresponding to a predetermined planned travel line.

The travel controller 40A controls automatic travel based on the result of detection of obstacles by the obstacle detector(s) 45. For example, the travel controller 40A continues automatic travel when the obstacle detector(s) 45 do/does not detect any obstacle, and stops automatic travel when the obstacle detector(s) 45 detects/detects an obstacle. More specifically, if the obstacle detector(s) 45 detect/detects an obstacle, the travel controller 40A stops automatic travel by stopping travel of the tractor 1 if the distance between the obstacle and the tractor 1 is less than or equal to a predetermined threshold (stop threshold).

In the example embodiment described above, the travel controller 40A stops travel of the tractor if the distance between the obstacle and the tractor 1 is less than or equal to the predetermined threshold (stop threshold). However, automatic travel may be performed such that the obstacle is avoided.

During automatic travel, the travel controller 40A continues the automatic travel when a seat-occupation detector 43 detects that the operator's seat 10 is occupied and stops the automatic travel when the seat-occupation detector 43 detects that the operator's seat 10 is not occupied.

The lifting controller 40B performs lifting control. When the manual lifting function is enabled and the lifting operation member is operated to achieve raising (ascending), the lifting controller 40B causes the lift cylinders 8e to extend by controlling the control valve 34 to raise rear end portions (end portions adjacent to the working device 2) of the lift arms 8a. With the lifting control, when the manual lifting function is enabled and the lifting operation member is operated to achieve lowering (descending), the lifting controller 40B causes the lift cylinders 8e to retract by controlling the control valve 34 to lower the rear end portions (end portions adjacent to the working device 2) of the lift arms 8a. When the working device 2 is raised by the linkage (lifting device) 8 and the position of the working device 2, that is, the angle of the lift arms 8a, reaches an upper limit (maximum height) set using a height setting dial, the raising performed by the linkage (lifting device) 8 is stopped.

With the lifting control, when a rear-up function is enabled, the lift cylinders 8e are extended by automatically controlling the control valve 34 upon rearward movement of the vehicle body 3 to raise the rear end portions (end portions adjacent to the working device 2) of the lift arms 8a. With the lifting control, when the auto-up function is enabled, the lift cylinders 8e are extended by automatically controlling the control valve 34 upon the angle of rotation of the steering device 11 reaching a predetermined angle or larger to raise the rear end portions (end portions adjacent to the working device 2) of the lift arms 8a.

As illustrated in FIG. 4, with an agricultural assistance system 100, an agricultural field map MP2 is created by capturing airborne images using an unmanned aerial vehicle (aerial vehicle) 70, and the planned travel line L1 is created based on the agricultural field map MP2. The unmanned aerial vehicle 70 is, for example, a multicopter.

The unmanned aerial vehicle 70 will be described below using a multicopter as an example.

The unmanned aerial vehicle (multicopter) 70 includes a body 70a, arm(s) 70b provided on the body 70a, a plurality of rotary wings 70c provided on the arm(s) 70b, and skid(s) 70d provided on the body 70a. The plurality of rotary wings 70c generate lift for the unmanned aerial vehicle 70 to fly. The unmanned aerial vehicle 70 includes at least two, preferably at least four, rotary wings 70c. Each of the plurality of rotary wings 70c includes a rotor to provide a rotational force and blades (propeller) which rotate by being driven by the rotor.

The unmanned aerial vehicle 70 includes an electrical storage 71, a sensor 72, a position detector 73, a storing unit (memory and/or storage) 74, a first communicator 75, and a controller 76. The electrical storage 71 is a battery, a capacitor, and/or the like, to store electricity. The electrical storage 71 is attached, for example, to the inside of the body 70a or to the body 70a.

The sensor 72 includes a CCD camera, an infrared camera, and/or the like, and is removably provided on a lower portion of the body 70a or is provided on the body 70a via bracket(s) (not shown). The sensor 72 is swingable relative to the bracket in the vertical direction and/or the horizontal direction and can change its sensing direction. Note that it is possible to control the swing of the sensor 72 in the horizontal direction and/or the vertical direction using the controller 76. For example, in a case that the unmanned aerial vehicle 70 is operated by a remote controller, once the controller 76 has acquired via the first communicator 75 a control signal transmitted from the remote controller, the controller 76 swings the sensor 72 in the horizontal direction and/or the vertical direction in accordance with the acquired control signal.

The position detector 73 is operable to detect the position (measured position information including latitude and longitude) thereof using a satellite positioning system as with the position detector 30, and includes a configuration similar to that of the position detector 30. The position detected by the position detector 73 may be referred to as "flight position". The position detector 73 is capable of detecting height information, i.e., altitude.

The communicator (first communicator) 75 is a communicator (communication module) to communicate with equipment external to the communicator of the tractor 1 (the communicator 51) directly or indirectly. The first communicator 75 can perform wireless communication via, for example, wireless fidelity (Wi-Fi, registered trademark) which is an IEEE802.11 standard, Bluetooth (registered trademark) Low Energy (BLE), Low Power, Wide Area (LPWA), Low-Power Wide-Area Network (LPWAN), or the like which are communication standards. The first communicator 75 may be a communicator (communication module) to perform wireless communication via a mobile telephone communication network, a data communication network, or the like.

The controller 76 controls the plurality of rotary wings 70c, and includes CPU(s) and the like. In a case that the unmanned aerial vehicle 70 includes at least two rotary wings 70c, the controller 76 outputs control signals to the rotors to make the rotational speed of one blade lower than the rotational speed of the other blade, thus causing the unmanned aerial vehicle to advance toward the one blade, or to make the rotational speed of the other blade lower than the rotational speed of the one blade, thus causing the unmanned aerial vehicle to advance toward the other blade. That is, the controller 76 controls the direction of travel of the unmanned aerial vehicle 70 by making the rotational speed of a blade in the direction of travel of the plurality of blades lower than the rotational speed of a blade in a direction opposite to the direction of travel. Also, the controller 76 causes the unmanned aerial vehicle 70 to hover by making the rotational speed of the plurality of blades constant.

The unmanned aerial vehicle 70 may be an aerial vehicle operated using a remote controller or may be an aerial vehicle which automatically flies, and is not limited.

Figure 6:
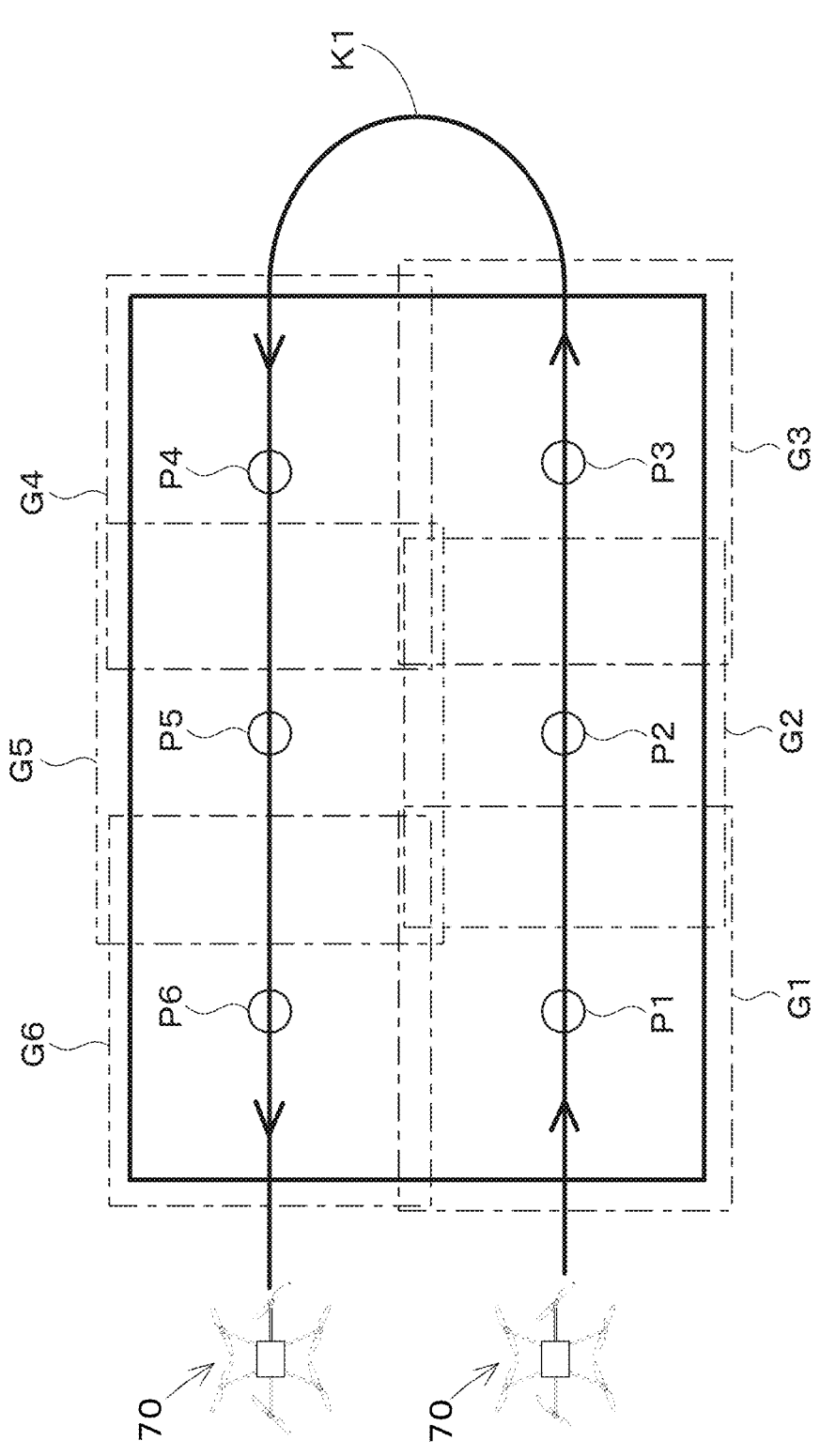
FIG. 6 illustrates how an unmanned aerial vehicle captures images.

As illustrated in FIG. 6, in creating the agricultural field map MP2, the unmanned aerial vehicle 70 flies over an agricultural field H1 along a flying path K1. The position detector 73 detects at least the latitude and the longitude of each position at which an image has been captured (image-capture position Pn, n=1 to 6). The unmanned aerial vehicle 70 associates the image-capture positions Pn, which are position information, with images Gn (n=1 to 6) captured by the sensor 72, and stores captured-image data in which the image-capture positions Pn and the images Gn are associated with each other, as airborne images. The unmanned aerial vehicle 70 transmits the captured-image data to the communicator 51 of the tractor 1.

Figure 7A:
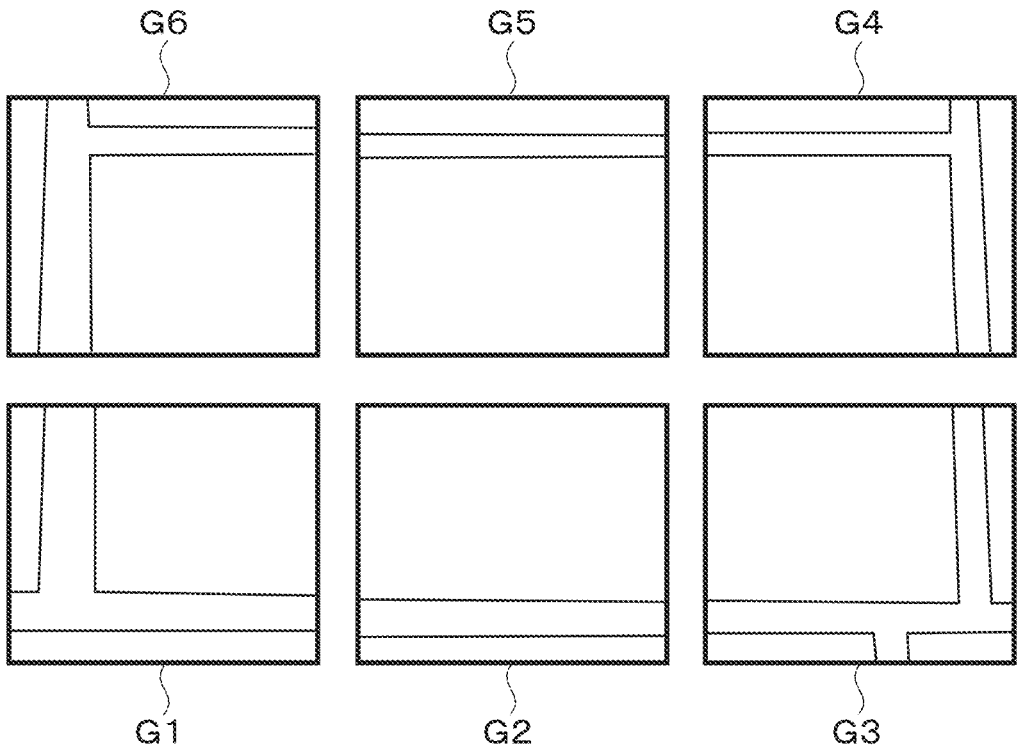
FIG. 7A illustrates a plurality of images.

For example, as illustrated in FIG. 7A, the communicator 51 of the tractor 1, for example, acquires captured-image data corresponding to the image-capture positions Pn (n=1 to 6) and the images Gn (n=1 to 6), and the captured-image data is stored in the controller 40, the display 50, and/or the like. Although FIGS. 6 and 7 illustrate an example in which images of an agricultural field divided in six portions are captured (n=1 to 6), the number (n) of portions of the agricultural field divided when capturing images is not limited.

Figure 7B:
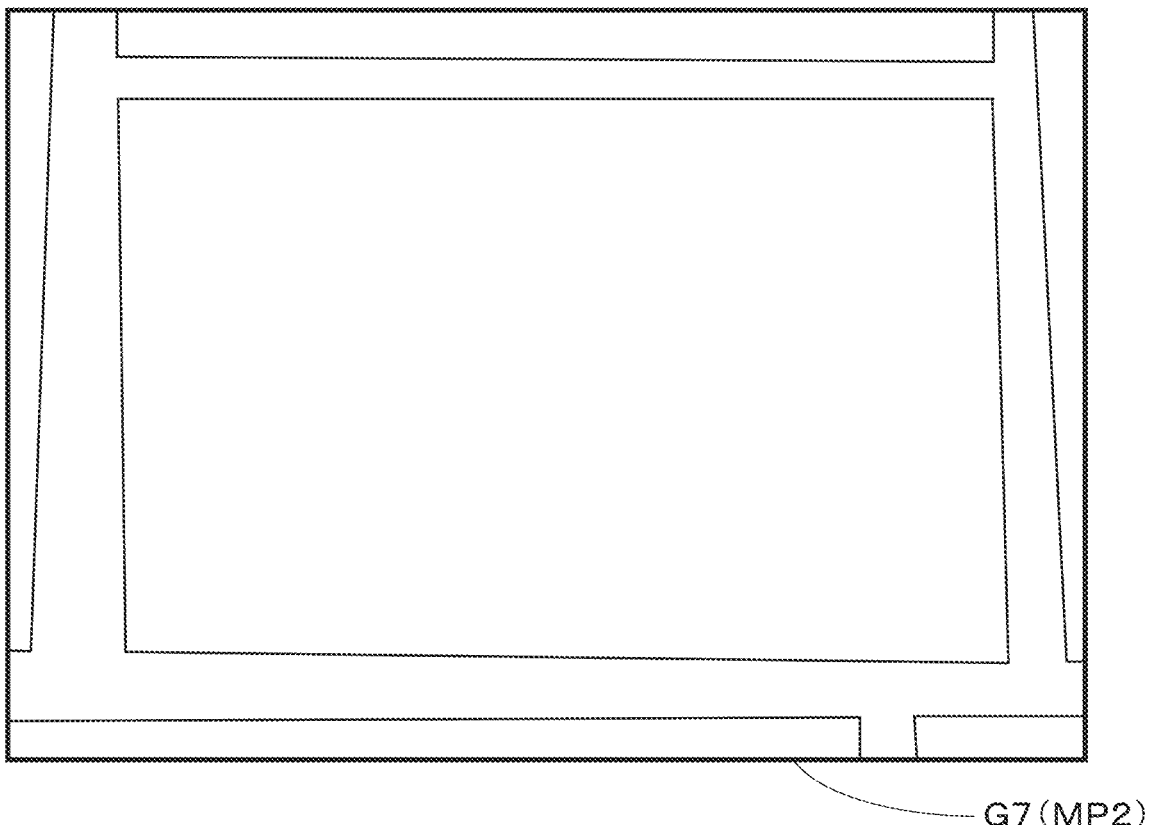
FIG. 7B illustrates an agricultural field map created by combining the plurality of images.

The controller 40 or the display 50 of the tractor 1 generates an agricultural field image of a predetermined agricultural field based on the acquired captured-image data. Specifically, the display 50 of the tractor 1 generates a predetermined agricultural field image by combining (joining) the images Gn included in the captured-image data in accordance with the positional relationship between pieces of position information (the image-capture positions Pn) of the captured-image data. As illustrated in FIG. 7A, the display 50 of the tractor 1 refers to the plurality of image-capture positions Pn and determines adjacent ones of the plurality of image-capture positions Pn. As illustrated in FIG. 7B, the display 50 of the tractor 1 combines the images Gn corresponding to the adjacent image-capture positions Pn into one image by image processing. The display 50 of the tractor 1, for example, generates a combined image G7 by combining the image G1 and the image G2, combining the image G2 and the image G3, combining the image G1 and the image G6, combining the image G2 and the image G5, and combining the image G3 and the image G4. Additionally or alternatively, the display 50 of the tractor 1 generates the agricultural field map MP2 by allocating position information to the combined image G7.

Although the display 50 of the tractor 1 combines a plurality of images based on the image-capture positions Pn of the captured-image data, in the process of combining images, the images may be combined by determining the position of each piece of captured-image data by feature extraction, matching, and/or the like. The image-capture positions Pn of the captured-image data may be used as supplemental information when an agricultural field image is analyzed. The agricultural field map MP2 created by the display 50 of the tractor 1 is transferred or transmitted to the tractor 1 and stored in the display 50 of the tractor 1 or the like.

As illustrated in FIG. 4, the display 50 includes a line creator 50A. The line creator 50A is includes electric/electronic circuit(s) provided in the display 50, program(s) stored in the display 50, and/or the like.

Figure 8:
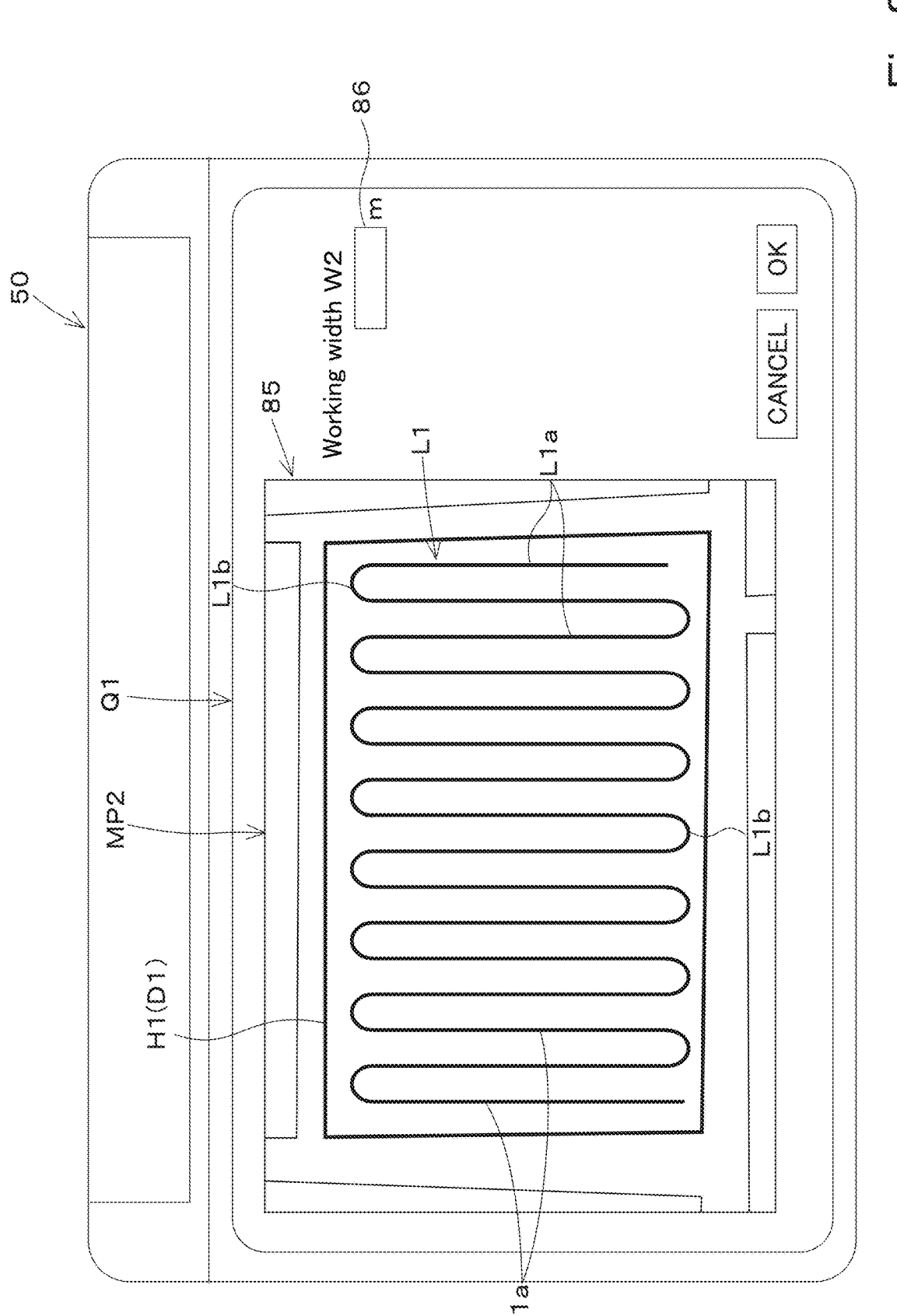
FIG. 8 illustrates a screen for creating a planned travel line.

The line creator 50A refers to the agricultural field map MP2 registered in advance in the display 50 or the like, and creates a travel line (planned travel line) L1 for the vehicle body 3 on the agricultural field map MP2. As illustrated in FIG. 8, the line creator 50A displays a line-setting screen Q1 on the display 50 when a predetermined operation is performed on the display 50. The line-setting screen Q1 includes a map-displaying portion 85 to display the agricultural field map MP2, and a width input portion 86. The line creator 50A displays a two-dimensional agricultural field map MP2 in the map-displaying portion 85, for example, automatically extracts the outline of the agricultural field H1 (the shape D1 of the agricultural field) from the two-dimensional agricultural field map MP2, and creates a travel line (planned travel line) L1 on a virtual field represented by the outline of the agricultural field H1 (the shape D1 of the agricultural field).

It is possible to extract the outline of the agricultural field H1 (the shape D1 of the agricultural field) from the agricultural field map MP2, for example, by detecting the boundaries between the agricultural field H1 and a road or a groove, etc., by image processing.

Figure 9A:
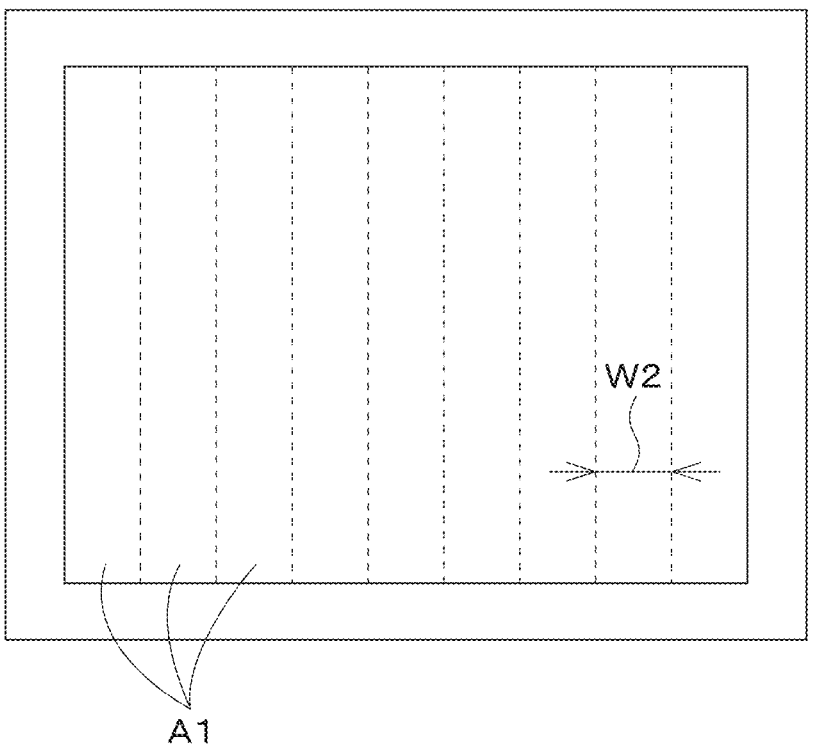
FIG. 9A illustrates an example of unit work zones.
Figure 9B:
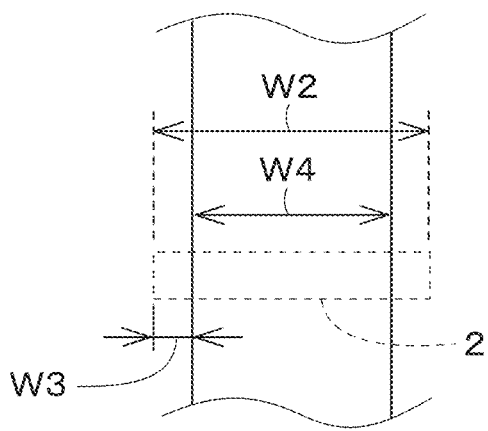
FIG. 9B illustrates a variation of a unit work zone.

Specifically, when the width (working width) W2 of the working device 2 is input to the width input portion 86, as illustrated in FIG. 9A, the line creator 50A creates a plurality of unit work zones A1 in each of which the working device 2 performs work, on the agricultural field map MP2 by dividing the outline of the agricultural field H1 (virtual field) using the working width W2 along the vertical or the horizontal direction. That is, the line creator 50A creates the plurality of unit work zones A1 each having the same width as the working width W2 on the agricultural field map MP2. As illustrated in FIG. 9B, the line creator 50A may create, on the agricultural field map MP2, a plurality of unit work zones A1 each having a width W4 obtained by subtracting overlap(s) W3 from the working width W2. The overlap W3 can be input via the line-setting screen Q1. That is, the line creator 50A sets, as each unit work zone A1, a minimum unit area in which the working device 2 performs work in the agricultural field H1 when the vehicle body 3 having the working device 2 connected thereto travels.

The line creator 50A creates a straight travel portion (straight travel line) L1a along which the vehicle body 3 travels straight, in each unit work zone A1 of the agricultural field map MP2. That is, the line creator 50A creates, for example, in the widthwise middle portion of the unit work zone A1, a linear straight travel portion L1a connecting opposite ends of the unit work zone A1 in the longitudinal direction. Moreover, the line creator 50A creates turn portion (s) (turn line(s)) L1b along which the vehicle body 3 turns. That is, the line creator 50A creates a turn portion L1b by connecting end portions of adjacent straight travel portions L1a in a curved manner.

Figure 10:
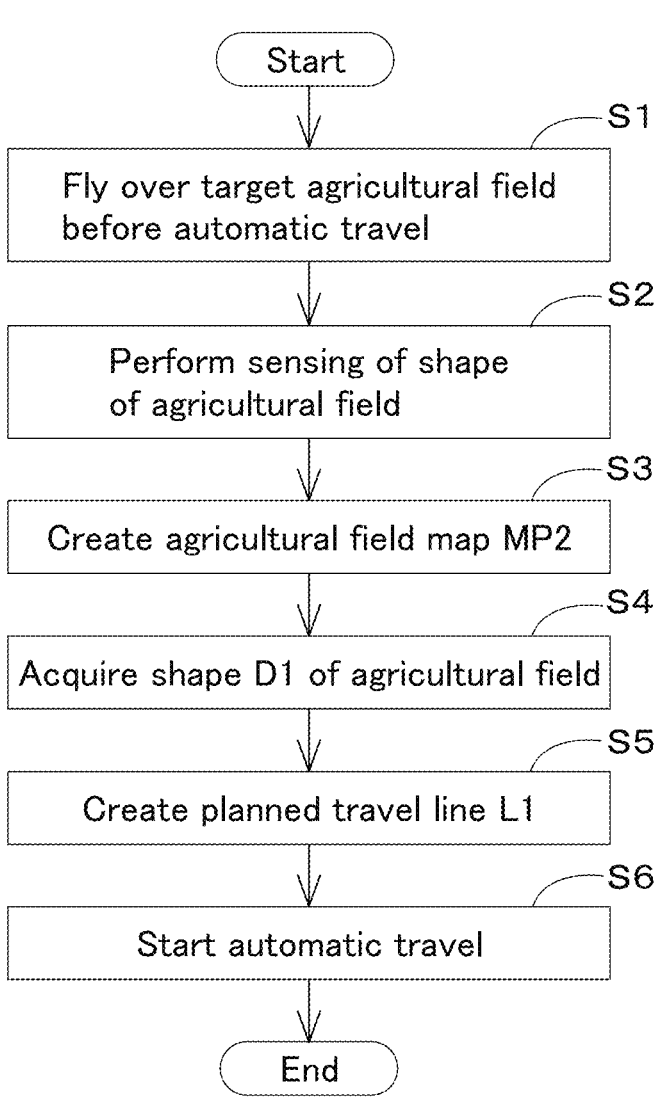
FIG. 10 is an operation flowchart from creation of an agricultural field map to automatic travel.

FIG. 10 is an operation flowchart from creation of the agricultural field map MP to automatic travel.

As shown in FIG. 10, before the tractor 1 performs work while automatically travelling in the agricultural field H1, the unmanned aerial vehicle 70 flies over the agricultural field in which work is to be performed (target agricultural field) H1 (S1) as illustrated in FIG. 6 and captures airborne images (captured-image data) of the agricultural field, that is, performs sensing of the shape of the agricultural field (S2). The controller 40 or the display 50 creates an agricultural field map MP2 from the airborne images (captured-image data), that is, sensed data (S3). The line creator 50A acquires the outline (shape) D1 of the agricultural field from the agricultural field map MP2 obtained by performing sensing before automatic operation of the tractor 1 (S4). The line creator 50A creates the planned travel line L1 on a virtual field that represents the acquired outline (shape) of the agricultural field (S5). After the planned travel line L1 is created, the tractor 1 performs automatic travel along the planned travel line L1 (S6).

Figure 11:
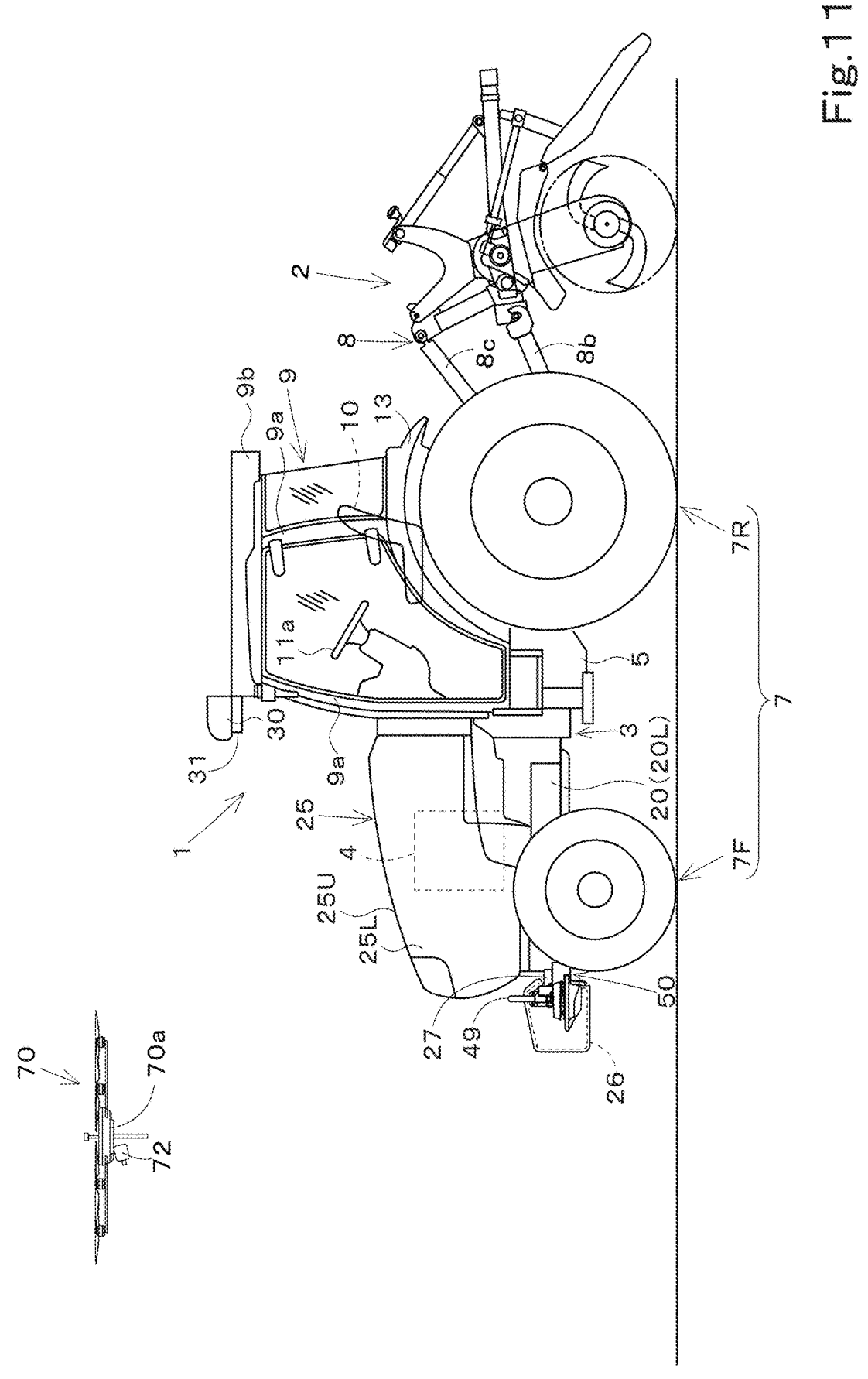
FIG. 11 illustrates a tractor and an unmanned aerial vehicle operating together in a linked manner.

As illustrated in FIG. 11, once the tractor 1 has started automatic travel, the unmanned aerial vehicle 70 flies over the agricultural field H1 in which the tractor 1 is performing automatic operation, and performs sensing of the agricultural field H1 by capturing images of the agricultural field H1. Pieces of information obtained by the unmanned aerial vehicle 70 performing the sensing, such as airborne images, are sequentially transmitted to the tractor 1.

The line creator 50A of the display 50 calculates the outline of the agricultural field H1 (the shape D1 of the agricultural field) from the information (airborne images) obtained by sensing by the unmanned aerial vehicle 70 during automatic operation of the tractor 1, and, if the calculated outline (the shape D1 of the agricultural field) significantly differs from that at the point in time at which the travel line (planned travel line) L1 was created (S5 in FIG. 10), corrects the virtual field based on the shape D1 of the agricultural field acquired during the automatic travel.

Figure 12:
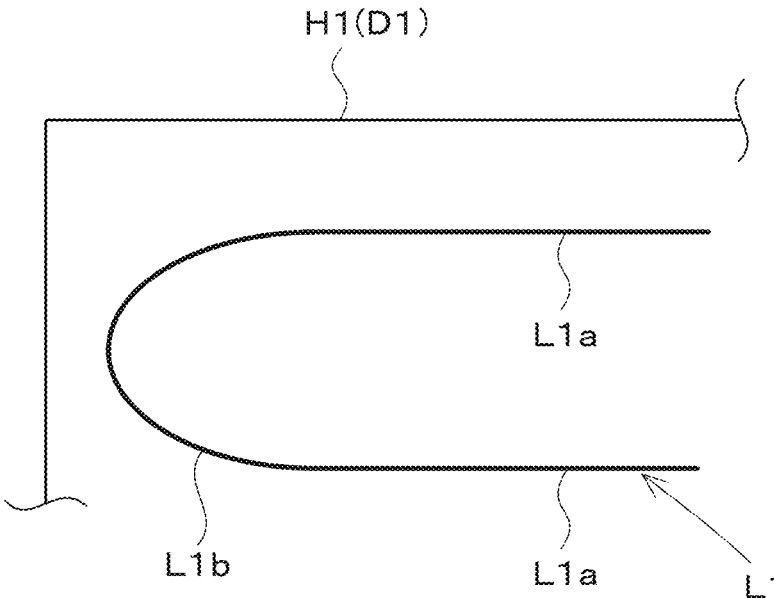
FIG. 12 illustrates changing a virtual field representing the outline (shape D1) of an agricultural field and a travel line.
Figure 12:
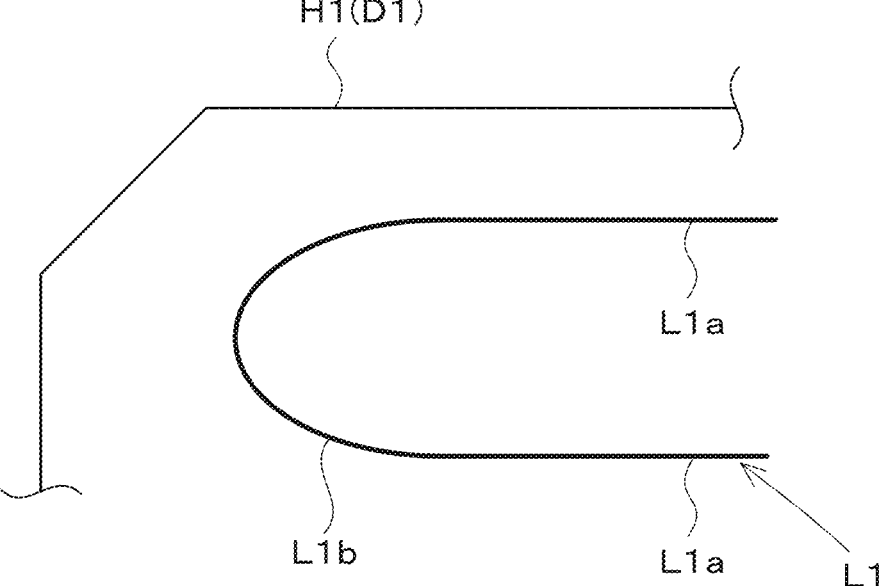

As illustrated in FIG. 12, if the shape D1 of the agricultural field obtained before the automatic travel has changed to the shape D1 of the agricultural field obtained from the airborne images after the automatic travel and the working device 2 is likely to stick out of the furrow (the shape D1 of the agricultural field), the line creator 50A changes the virtual field (the outline of the agricultural field H1 (the shape D1 of the agricultural field)) to the post-travel virtual field and also changes the travel line (planned travel line) L1 so that the working device 2 will not stick out even when the tractor 1 turns.

Figure 13:
FIG. 13 illustrates an example of an agricultural field represented three-dimensionally.

As illustrated in FIG. 4, the agricultural assistance system 100 may include a calculator 50B. As illustrated in FIG. 13, the calculator 50B calculates the three-dimensional shape D2 of the agricultural field H1 by combining pieces of information, such as airborne images, obtained by the unmanned aerial vehicle 70 sensing the agricultural field H1. The calculator 50B may calculate the three-dimensional shape D2 of the agricultural field H1 from the airborne images before the automatic travel, and may calculate the three-dimensional shape D2 of the agricultural field H1 from the airborne images during the automatic travel. As illustrated in FIG. 13, the line creator 50A acquires the three-dimensional shape D2 of the agricultural field H1 calculated by the calculator 50B, and creates the planned travel line L1 by depicting the planned travel line L1 in a virtual field that represents the acquired three-dimensional shape D2 of the agricultural field H1. As described above, it is possible to perform automatic travel more accurately in a case that the three-dimensional shape D2 of the agricultural field H1 is acquired.

Figure 14A:
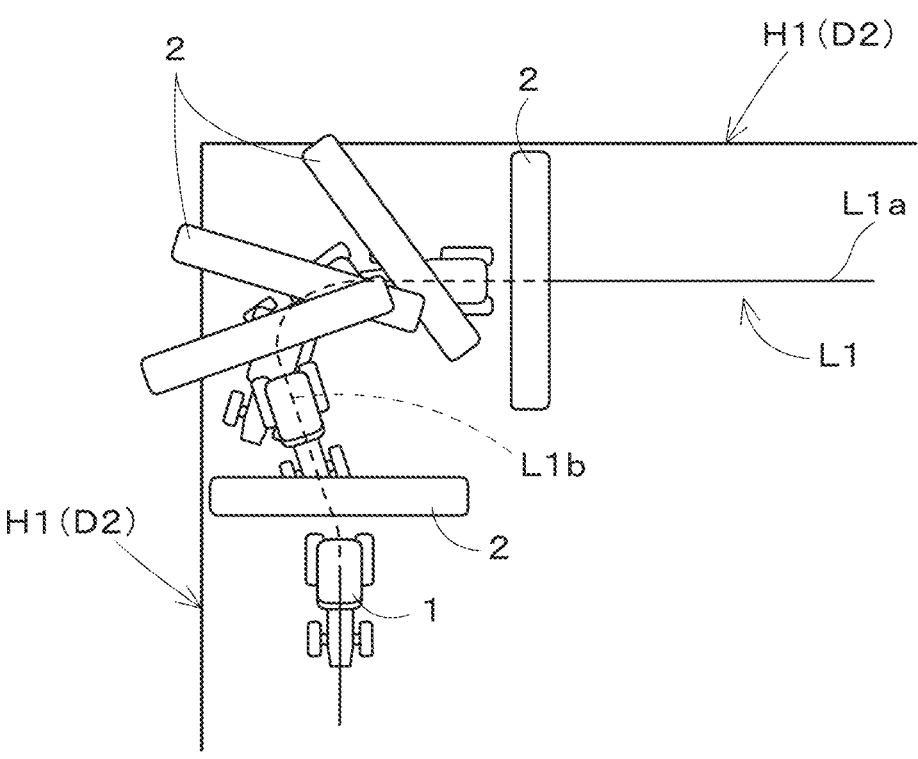
FIG. 14A illustrates a situation in which there would be no problem even if a working device stuck out of an agricultural field (furrow) when the tractor turns.
Figure 14B:
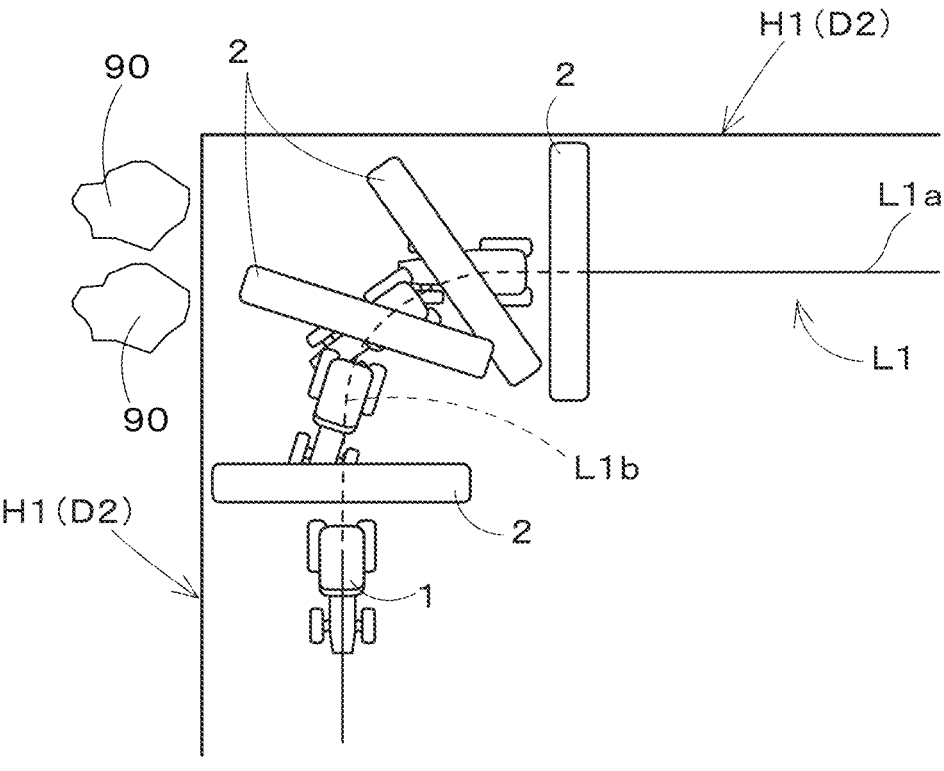
FIG. 14B illustrates a situation in which there would be a problem if a working device stuck out of the agricultural field (furrow) when the tractor turns.

For example, as illustrated in FIG. 14A, it is possible, when the tractor 1 is automatically travelling along the planned travel line L1, to determine whether or not the working device 2 will collide with an obstacle or the like if the working device 2 sticks out over the boundary of the agricultural field H1, that is, when the working device 2 sticks out into a furrow or the like. As illustrated in FIG. 14A, in a case that the working device 2 is likely to travel without colliding with any obstacle or the like even if the working device 2 sticks out during automatic travel, the line creator 50A does not change the planned travel line L1. On the contrary, as illustrated in FIG. 14B, in a case that the working device 2 is likely to collide with an obstacle 90 or the like if the working device 2 sticks out during automatic travel, the line creator 50A corrects the planned travel line L1 so that the working device 2 will not collide with the obstacle 90 when the tractor 1 automatically turns.

Second Example Embodiment

FIGS. 15 to 18 illustrate an agricultural machine (a tractor 1) according to a second example embodiment. Note that the tractor 1 and the like illustrated in FIGS. 15 to 18 may be applied to the first example embodiment.

Figure 17A:
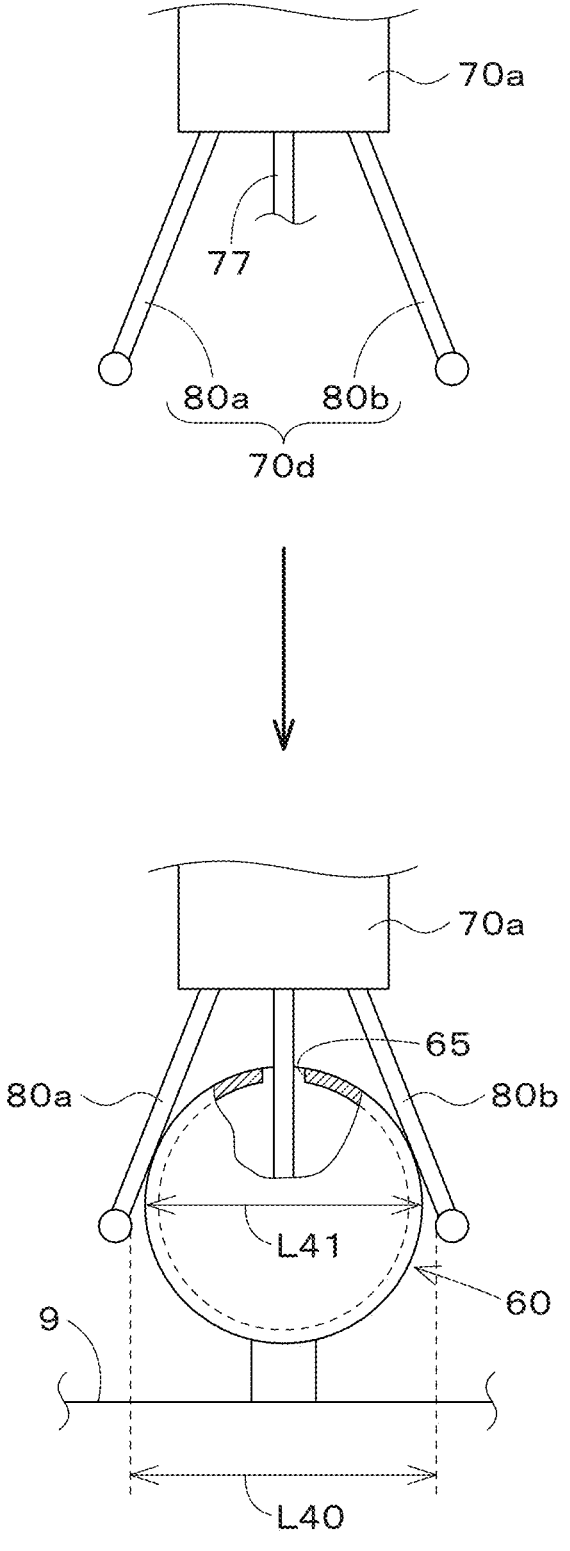
FIG. 17A illustrates skids of an unmanned aerial vehicle and a takeoff/landing station.
Figure 17B:
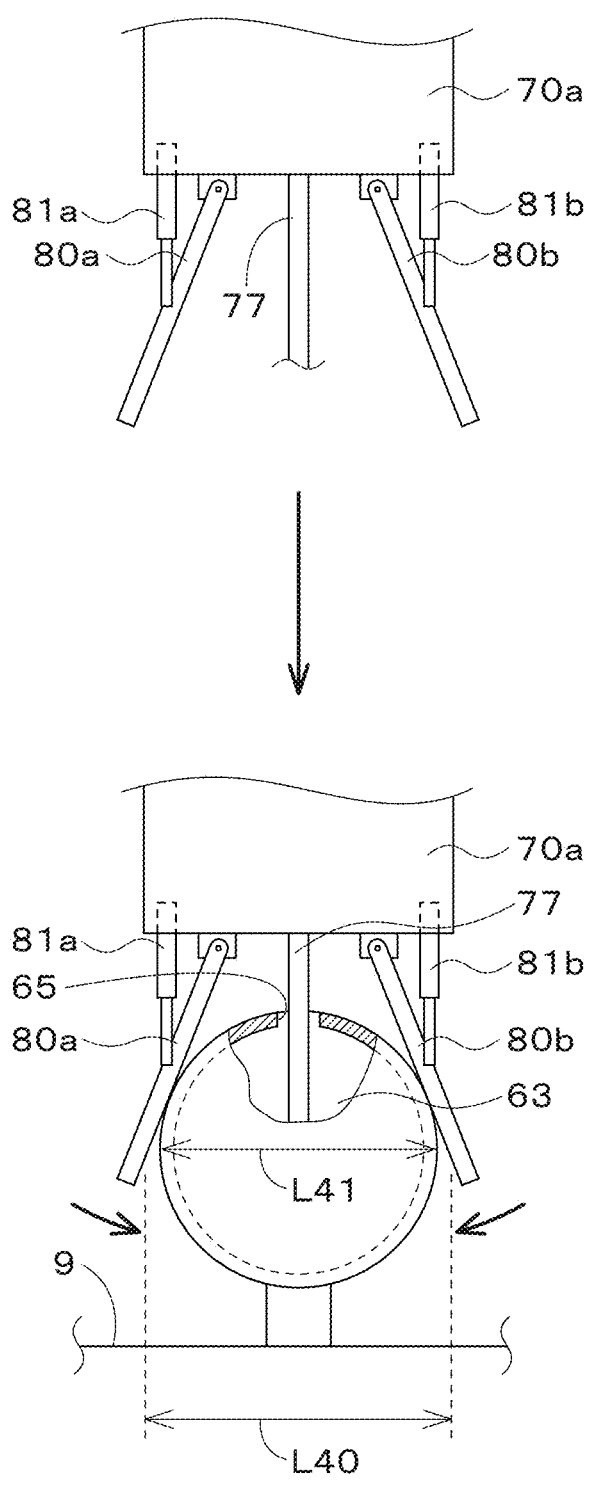
FIG. 17B illustrates skids different from those in FIG. 17A and a takeoff/landing station.
Figure 17C:
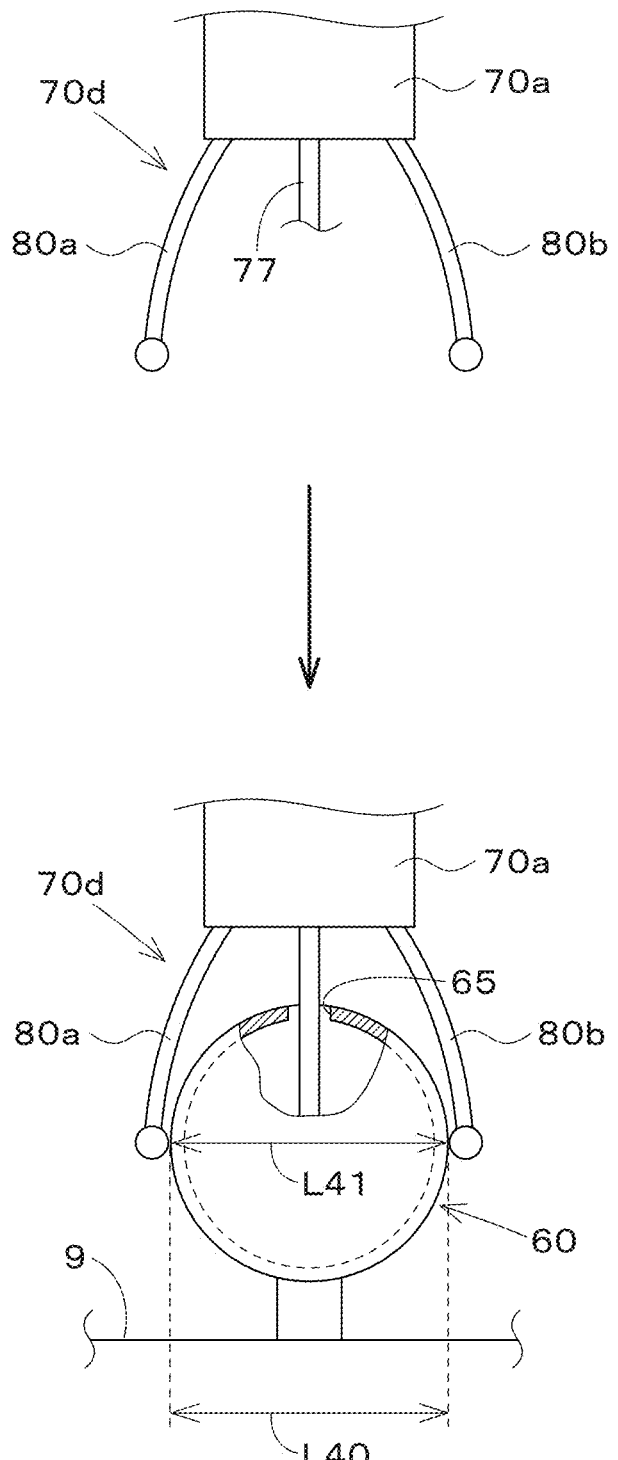
FIG. 17C illustrates skids different from those in FIGS. 17A and 17B and a takeoff/landing station.
Figure 18:
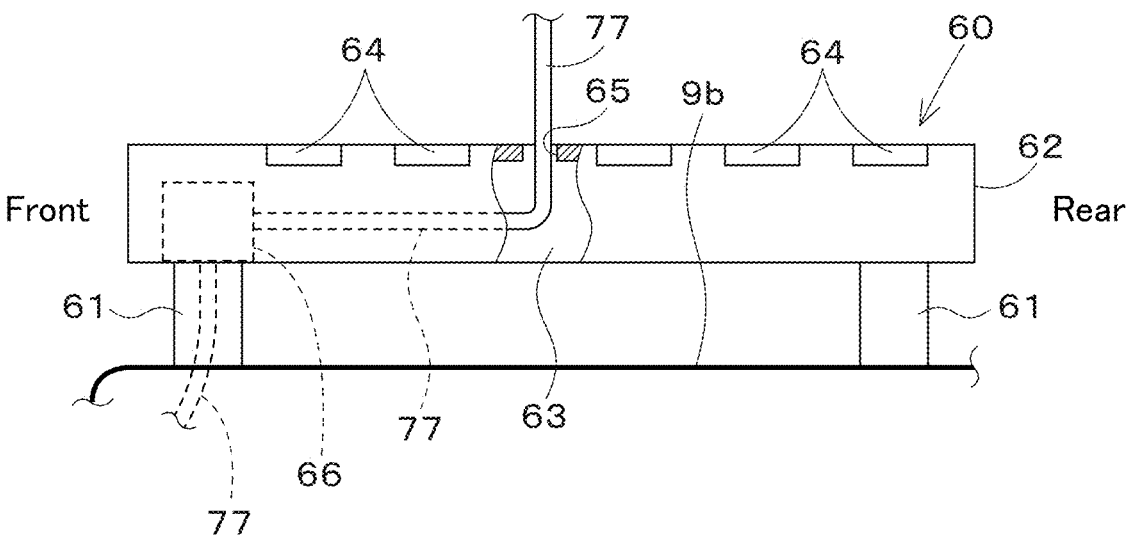
FIG. 18 is an enlarged view of the landing station.

The tractor 1 includes a takeoff/landing station 60. The takeoff/landing station 60 is provided on the roof 9b of the protector 9 and can restrict the skid(s) 70d when the unmanned aerial vehicle 70 lands. As illustrated in FIGS. 17A to 17C, when the unmanned aerial vehicle 70 lands, the takeoff/landing station 60 can restrict the movement of the skids 70d in the horizontal direction as a portion of the takeoff/landing station 60 contacts leg portions 80a and 80b of the skids 70d.

Figure 15:
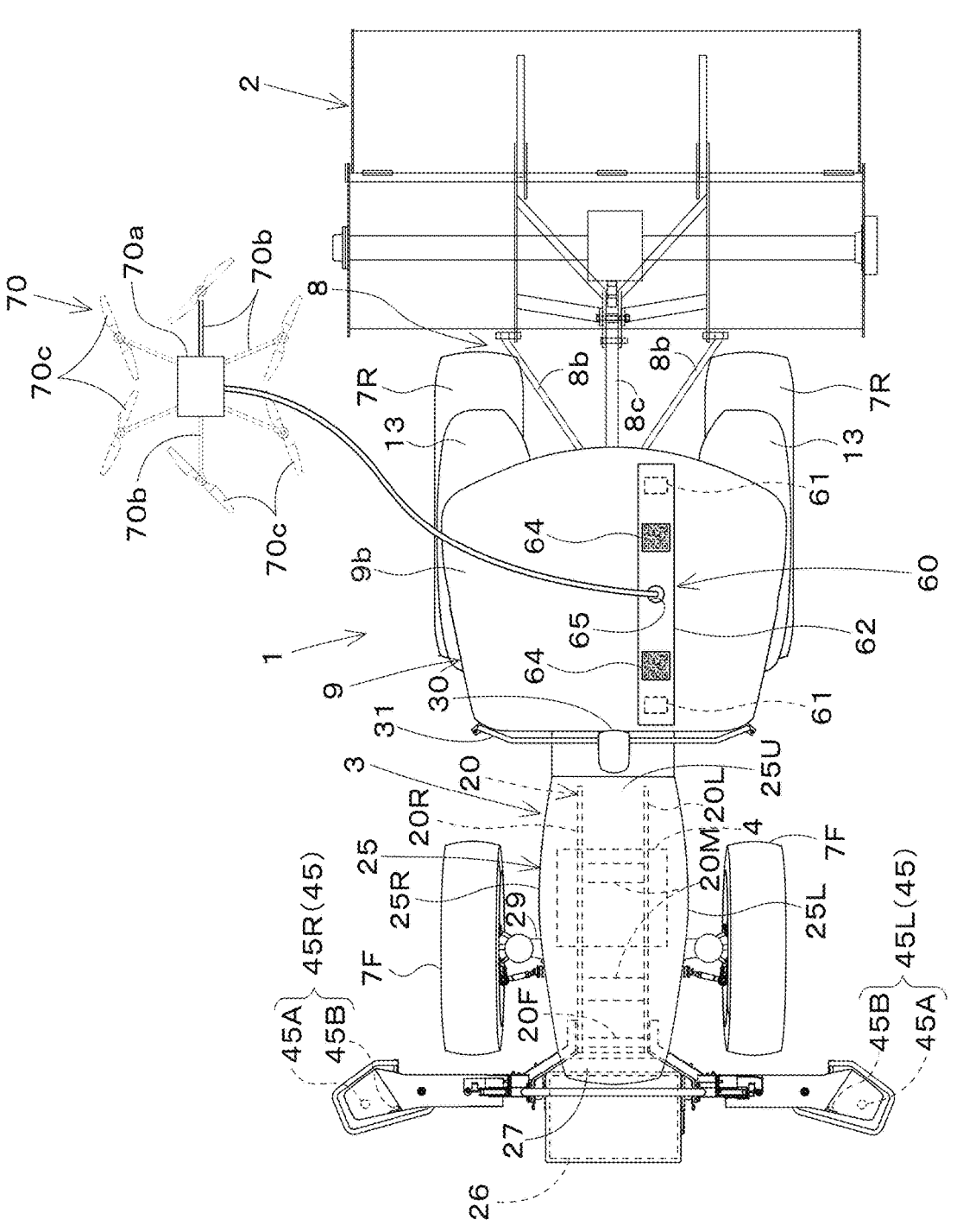
FIG. 15 is an overall plan view of a tractor including a takeoff/landing station according to a second example embodiment.
Figure 16:
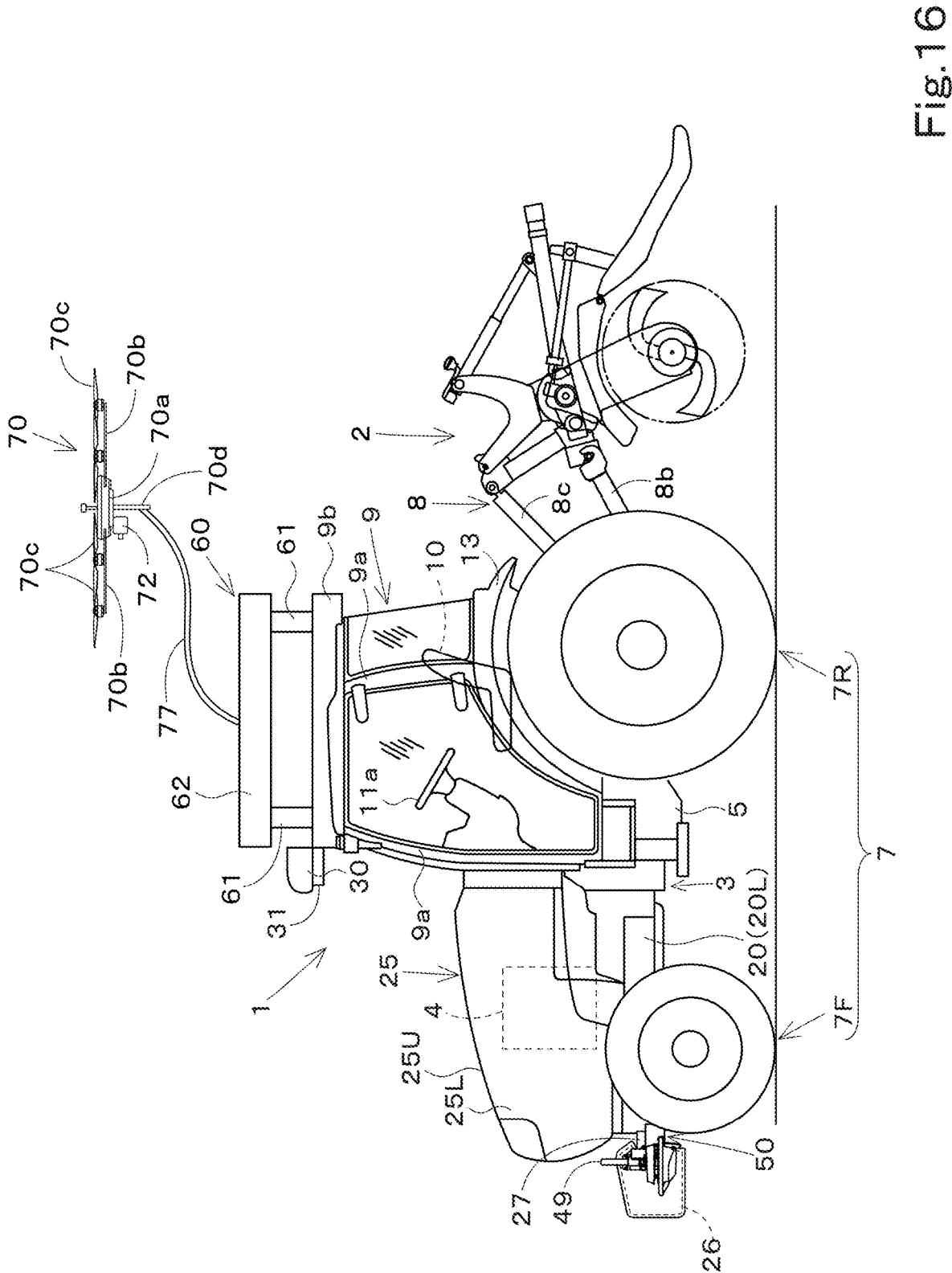
FIG. 16 is an overall side view of a tractor including a takeoff/landing station.

As illustrated in FIGS. 15 and 16, specifically, the takeoff/ landing station 60 includes support members 61 and an arm 62. The support members 61 support the arm 62 on the roof 9*b* of the protector 9, and are provided on a front portion and a back portion of the roof 9*b*, respectively. The arm 62 is supported on the roof 9*b* via the support members 61 and extends in a horizontal direction. Specifically, one end of the arm 62 is located at the front end of the roof 9*b* and the other end of the arm 62 is located at the rear end of the roof 9*b*.

The arm 62 includes, for example, a circular or quadrangular tube, is hollow, and has a space 63 therein. As illustrated in FIGS. 17A to 17C, assuming that the distance from one leg portion 80*a* to the other leg portion 80*b* of the unmanned aerial vehicle 70 when the unmanned aerial vehicle 70 lands is a distance L40, the width L41 of the arm 62 is less than or equal to the distance L40.

As illustrated in FIG. 15, the arm 62 includes marker(s) 64 that is visually recognizable to the aerial vehicle 70. The marker 64 is provided on the outer surface of the arm 62, and when the arm 62 is viewed in plan view, the sensor 72 of the unmanned aerial vehicle 70 can recognize the marker 64 from above.

When the unmanned aerial vehicle 70 is about to land, the sensor 72 first recognizes the presence or absence of the tractor 1, that is, recognizes the position of the marker 64 of the arm 62 from above the agricultural field. Upon recognition of the marker 64, the controller 76 of the unmanned aerial vehicle 70 causes the unmanned aerial vehicle 70 to fly toward the position of the marker 64, and, when the unmanned aerial vehicle 70 reaches a position above the marker 64, causes the unmanned aerial vehicle 70 to land (move) toward the arm 62 (the marker 64) while gradually reducing the altitude of the unmanned aerial vehicle 70.

In a case that the skids 70*d* are as illustrated in FIG. 17A, the unmanned aerial vehicle 70 completes its landing when the leg portions 80*a* and 80*b* of the skids 70*d* contact the arm 62. In a case that the skids 70*d* are as illustrated in FIG. 17B, upon the skids 70*d* reaching the arm 62, the unmanned aerial vehicle 70 swings the leg portions 80*a* and 80*b* toward the arm 62 by extending or retracting actuators 81*a* and 81*b*, and completes its landing when the leg portions 80*a* and 80*b* contact the arm 62. The actuators 81*a* and 81*b* are extended or retracted by the controller 76 outputting control signals to the actuators 81*a* and 81*b*.

In a case that the skids 70*d* are as illustrated in FIG. 17C, when the skids 70*d* of the unmanned aerial vehicle 70 reach the arm 62 and the leg portions 80*a* and 80*b* contact the arm 62, the leg portions 80*a* and 80*b* deform due to contact with the arm 62. The unmanned aerial vehicle 70 completes its landing when the leg portions 80*a* and 80*b* hold the arm 62.

As described above, by providing the tractor 1 with the takeoff/landing station 60, it is possible to cause the unmanned aerial vehicle 70 to land on the tractor 1.

The unmanned aerial vehicle 70 may include a cable 77. The following discusses a case where the unmanned aerial vehicle 70 includes the cable 77.

The cable 77 is used to supply electric power to the unmanned aerial vehicle 70. One end of the cable 77 is provided inside the body 70*a*, and is connected via a connector and/or the like to a power line PW1 which supplies electric power to the controller 76 and/or the like. Alternatively, one end of the cable 77 may be connected to the electrical storage 71. The other end of the cable 77 is connected via a connector and/or the like to a power line PW2 which supplies electric power to the controller 40 and/or the like. The other end of the cable 77 may be connected to a battery or the like provided in the tractor 1. This makes it possible to supply electric power from the tractor 1 to the unmanned aerial vehicle 70 via the cable 77, and possible to allow the unmanned aerial vehicle 70 to fly for a long time.

Figure 19:
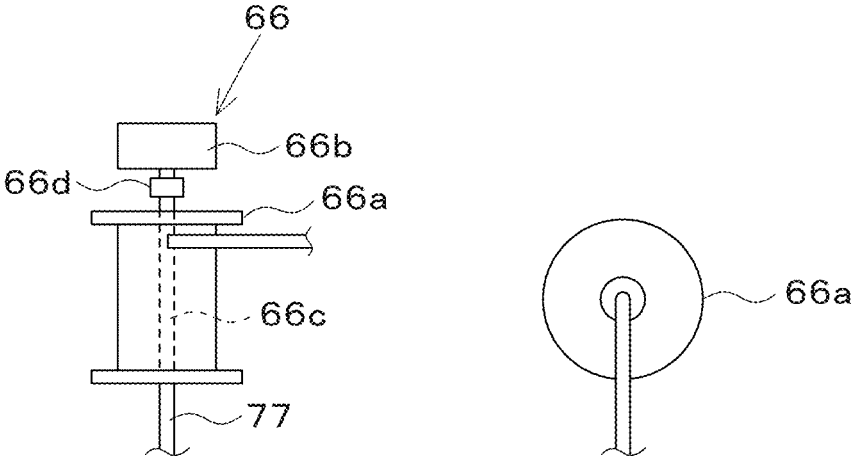
FIG. 19 illustrates a winder.

As illustrated in FIGS. 17A to 17C and 18, the arm 62 of the takeoff/landing station 60 has a through-hole 65 for passage of the cable 77, and the space 63 in the arm 62 is used as a container to contain the cable 77. In the container, a winder 66 to take up the cable 77 is provided. As illustrated in FIG. 19, the winder 66 includes a cylindrical bobbin (take-up portion) 66*a* that is rotatably supported and takes up the cable 77 by rotating, and a motor 66*b* to rotate the bobbin 66*a*. The cable 77 extends to the interior of the tractor 1 through a rotary shaft 66*c* of the bobbin 66*a*.

This makes it possible to take up the cable 77 by causing the motor 66*b* to rotate the bobbin 66*a* of the winder 66. When the cable 77 wound around the bobbin 66*a* is pulled by movement of the unmanned aerial vehicle 70, the cable 77 can be paid out as the bobbin 66*a* rotates freely due to the pulling force. The winder 66 may be provided with a clutch 66*d* that can disengage connection between the rotary shaft of the motor 66*b* and the rotary shaft 66*c* of the bobbin 66*a*.

As described above, in the case where the winder 66 is provided, the controller 40 of the tractor 1 outputs a control signal to the motor 66*b* to rotate the rotary shaft of the motor 66*b* in a direction that takes up the cable 77 (take-up direction). In a situation in which the rotary shaft of the motor 66*b* is rotated in the take-up direction, a force that acts on the rotary shaft of the motor 66*b* (first load) or a force that acts on the rotary shaft 66*c* of the bobbin 66*a* (second load) is monitored. For example, when the cable 77 is pulled by movement of the unmanned aerial vehicle 70 and the first load or the second load reaches a predetermined load or greater, the controller 40 stops driving of the motor 66*b*, that is, stops rotation of the motor 66*b* in the take-up direction. Alternatively, when the first load or the second load reaches a predetermined load or more, the controller 40 rotates the motor 66*b* in a direction opposite to the take-up direction to pay out the cable 77.

That is, the controller 40 controls tension that acts on the cable 77 to be substantially constant by driving the winder 66.

An agricultural assistance system 100 as has been described includes a sensor 72 in or on an unmanned aerial vehicle 70 to perform sensing of a shape of an agricultural field H1 when the unmanned aerial vehicle 70 flies over the agricultural field H1, and a line creator 50A configured or programmed to create a planned travel line L1 for automatic operation of an agricultural machine (tractor 1), wherein the line creator 50A is configured or programmed to acquire the shape of the agricultural field H1 obtained by the sensing before the automatic operation of the agricultural machine (tractor 1), and create the planned travel line L1 on a virtual field representing the acquired shape of the agricultural field H1. With this, by sensing the shape of the agricultural field H1 before automatic travel using the unmanned aerial vehicle 70, it is possible to acquire the shape of the agricultural field H1 more accurately, and possible to easy create the planned travel line L1 for automatic travel on the virtual field that accurately represents the agricultural field H1.

The unmanned aerial vehicle 70 may be operable to fly over the agricultural field H1 in which the agricultural machine (tractor 1) is performing the automatic operation. The line creator 50A may be configured or programmed to acquire the shape of the agricultural field H1 obtained by the sensing during the automatic operation of the agricultural machine (tractor 1), and correct the virtual field based on the acquired shape of the agricultural field H1. With this, since it is possible to perform sensing of the shape of the agricultural field H1 also during automatic travel, it is possible to know the shape of the agricultural field H1 more accurately.

The line creator 50A may be configured or programmed to correct the planned travel line L1 such that the corrected planned travel line L1 corresponds to the virtual field corrected based on the shape of the agricultural field H1. With this, it is possible to correct the planned travel line L1 on the virtual field which has been corrected by performing sensing of the shape of the agricultural field H1 also during automatic travel, and it is possible to perform automatic travel more accurately.

The agricultural assistance system 100 may further include a calculator 50B to calculate a three-dimensional shape of the agricultural field H1 based on information obtained by the sensor 72 performing the sensing of the agricultural field H1. The line creator 50A may be configured or programmed to acquire the three-dimensional shape of the agricultural field H1 calculated by the calculator, and create the planned travel line L1 based on the acquired three-dimensional shape of the agricultural field H1. With this, it is possible to know the three-dimensional shape of the agricultural field H1, and, in creating the planned travel line L1, it is possible to also take the perpendicular direction (gravitational direction) into consideration.

The agricultural machine (tractor 1) may include a cable to supply electric power to the unmanned aerial vehicle 70 flying over the agricultural field H1. With this, it is possible to allow the unmanned aerial vehicle 70 to fly for a long time using electric power supplied from the agricultural machine (tractor 1).

The agricultural machine (tractor 1) may include a takeoff/landing station 60 for the unmanned aerial vehicle 70 to take off and land, and the unmanned aerial vehicle 70 may be operable to take off from the takeoff/landing station 60 before the automatic operation of the agricultural machine (tractor 1), and perform the sensing of the shape of the agricultural field H1 using the sensor 72. With this, for example, before starting automatic travel, it is possible to cause the unmanned aerial vehicle 70 to take off from the takeoff/landing station 60, and it is possible to reliably know the shape of the agricultural field H1 in which the agricultural machine (the tractor 1) performs work (travel).

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural assistance system comprising:
a sensor in or on an unmanned aerial vehicle to capture an image of an agricultural field when the unmanned aerial vehicle flies over the agricultural field;
an agricultural machine; and
a line creator, including an electric circuit or an electronic circuit, configured or programmed to create a planned travel line for automatic operation of the agricultural machine; wherein
the line creator is configured or programmed to extract a first outline representing an outline of the agricultural field from a first two-dimensional agricultural field map created from a first captured image captured by the sensor before the automatic operation of the agricultural machine, and create the planned travel line within the extracted first outline of the agricultural field;

once the agricultural machine has started the automatic operation, the unmanned aerial vehicle is operable to fly over the agricultural field in which the agricultural machine is performing the automatic operation;
the line creator is configured or programmed:
to extract a second outline representing an outline of the agricultural field from a second two-dimensional agricultural field map created from a second captured image captured by the sensor during the automatic operation of the agricultural machine; and
if the second outline acquired during the automatic operation differs from the first outline acquired before the automatic operation and if a working device of the agricultural machine sticks out of the second outline when the agricultural machine turns, to change the first outline acquired before the automatic operation to the second outline acquired during the automatic operation, and to change the planned travel line so that the working device of the agricultural machine does not stick out of the second outline; and
the agricultural machine performs automatic travel along the changed planned travel line.

2. The agricultural assistance system according to claim 1, wherein the agricultural machine includes a cable to supply electric power to the unmanned aerial vehicle flying over the agricultural field.

3. The agricultural assistance system according to claim 1, wherein
the agricultural machine includes a takeoff/landing station for the unmanned aerial vehicle to take off and land; and
the unmanned aerial vehicle is operable to take off from the takeoff/landing station before the automatic operation of the agricultural machine, and capture the image of the agricultural field using the sensor.

4. An agricultural assistance system comprising:
a sensor in or on an unmanned aerial vehicle to capture an image of an agricultural field when the unmanned aerial vehicle flies over the agricultural field;
an agricultural machine; and
a line creator, including an electric circuit or an electronic circuit, configured or programmed to create a planned travel line for automatic operation of the agricultural machine; wherein
the line creator is configured or programmed to extract a first outline representing an outline of the agricultural field from a first two-dimensional agricultural field map created from a first captured image captured by the sensor before the automatic operation of the agricultural machine, and create the planned travel line within the extracted first outline of the agricultural field;
once the agricultural machine has started the automatic operation, the unmanned aerial vehicle is operable to fly over the agricultural field in which the agricultural machine is performing the automatic operation;
the line creator is configured or programmed:
to extract a second outline representing an outline of the agricultural field from a second two-dimensional agricultural field map created from a second captured image captured by the sensor during the automatic operation of the agricultural machine; and
when the agricultural machine is automatically traveling along the planned travel line, to determine whether a working device of the agricultural machine does not collide with an obstacle outside the agricultural field even if the working device sticks out of the second outline of the agricultural field, and (i) in a case that the working device is capable of traveling without colliding with the obstacle outside the agricultural field even if the working device sticks out of the second outline when the agricultural machine turns during the automatic travel, not to change the planned travel line, and (ii) in a case that the working device collides with the obstacle outside the agricultural field when the working device sticks out during automatic travel, to change the planned travel line so that the working device does not collide with the obstacle outside the agricultural field when the agricultural machine turns; and the agricultural machine performs automatic travel along the changed planned travel line.

\* \* \* \* \*